(12) United States Patent
Kozlenko et al.

(10) Patent No.: US 11,873,116 B2
(45) Date of Patent: *Jan. 16, 2024

(54) AUTOMATED DOCKING OF UNMANNED AERIAL VEHICLE

(71) Applicant: Skydio, Inc., Redwood City, CA (US)

(72) Inventors: Yevgeniy Kozlenko, Mountain View, CA (US); Jack Zhu, San Francisco, CA (US); Gareth Benoit Cross, San Carlos, CA (US); Teodor Tomic, Redwood City, CA (US); Adam Bry, Redwood City, CA (US); Abraham Galton Bachrach, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 515 days.

This patent is subject to a terminal disclaimer.

(21) Appl. No.: 16/991,122

(22) Filed: Aug. 12, 2020

(65) Prior Publication Data
US 2021/0107682 A1 Apr. 15, 2021

Related U.S. Application Data

(60) Provisional application No. 62/915,639, filed on Oct. 15, 2019.

(51) Int. Cl.
*B64F 1/22* (2006.01)
*B64D 45/08* (2006.01)
(Continued)

(52) U.S. Cl.
CPC .............. *B64F 1/222* (2013.01); *B64D 45/08* (2013.01); *B64F 1/18* (2013.01); *B64C 39/024* (2013.01);
(Continued)

(58) Field of Classification Search
CPC ...... B64F 1/18; B64F 1/20; B64F 1/22; B64F 1/222; B64F 1/007; B64C 2201/201;
(Continued)

(56) References Cited

U.S. PATENT DOCUMENTS 9,448,562 B1    9/2016  Sirang et al.
11,370,560 B2   6/2022  Nishikawa et al.
(Continued)

FOREIGN PATENT DOCUMENTS

WO    2016115574 A1    7/2016
WO    2019038532 A1    2/2019
(Continued)

OTHER PUBLICATIONS

International Search Report and Written Opinion mailed in corresponding PCT application PCT/US2020/055537 dated Jan. 28, 2021.

*Primary Examiner* — Richard Green
*Assistant Examiner* — Arfan Y. Sinaki
(74) *Attorney, Agent, or Firm* — Young Basile Hanlon & MacFarlane, P.C.

(57) ABSTRACT

Described herein are systems for automated docking of an unmanned aerial vehicle. For example, some systems include an unmanned aerial vehicle including a propulsion mechanism, an image sensor, and processing apparatus; and a dock including a landing surface configured to hold the unmanned aerial vehicle and a fiducial on the landing surface, wherein the processing apparatus is configured to: control the propulsion mechanism to cause the unmanned aerial vehicle to fly to a first location in a vicinity of the dock; access one or more images captured using the image sensor; detect the fiducial in at least one of the one or more images; determine a pose of the fiducial based on the one or more images; and control, based on the pose of the fiducial, (Continued)

the propulsion mechanism to cause the unmanned aerial vehicle to land on the landing surface.

20 Claims, 10 Drawing Sheets

(51) Int. Cl.
  *B64F 1/18* (2006.01)
  *B64C 39/02* (2023.01)
  *B64U 50/19* (2023.01)
  *B64U 80/70* (2023.01)

(52) U.S. Cl.
  CPC .............. *B64U 50/19* (2023.01); *B64U 80/70* (2023.01); *B64U 2201/10* (2023.01)

(58) Field of Classification Search
  CPC ........ B64D 45/08; B64U 70/95; B64U 80/10; B64U 80/70
  See application file for complete search history.

(56) References Cited

U.S. PATENT DOCUMENTS

| | | |
|---|---|---|
| 2016/0311329 A1 | 10/2016 | Rodriguez |
| 2017/0336804 A1 | 11/2017 | Yang et al. |
| 2018/0009549 A1 | 1/2018 | Sullivan et al. |
| 2018/0039286 A1* | 2/2018 | Tirpak ................. G05D 1/0653 |
| 2018/0237161 A1* | 8/2018 | Minnick ................. B60L 53/37 |
| 2018/0362188 A1 | 12/2018 | Achtelik et al. |
| 2019/0187724 A1* | 6/2019 | Li ......................... G05D 1/0676 |
| 2019/0344679 A1* | 11/2019 | Miller .................... B64C 39/024 |
| 2019/0344888 A1* | 11/2019 | Ben-David .......... G05D 1/0676 |
| 2020/0047916 A1* | 2/2020 | Bosworth .............. B64C 25/52 |
| 2020/0073409 A1* | 3/2020 | Mai ........................... G06T 7/90 |
| 2020/0130864 A1* | 4/2020 | Brockers ............... B64C 39/024 |
| 2021/0031947 A1* | 2/2021 | Wankewycz .............. E04H 6/44 |
| 2021/0070468 A1* | 3/2021 | Svirsky ................... B64F 1/222 |
| 2021/0107682 A1 | 4/2021 | Kozlenko et al. |
| 2021/0276734 A1 | 9/2021 | Kozlenko et al. |

FOREIGN PATENT DOCUMENTS

| | | |
|---|---|---|
| WO | 2019/151947 A1 | 8/2019 |
| WO | WO-2020181329 A1 * | 9/2020 |

* cited by examiner

AUTOMATED DOCKING OF UNMANNED AERIAL VEHICLE

CROSS REFERENCE TO RELATED APPLICATIONS

This application claims the benefit of U.S. Provisional Application No. 62/915,639, filed Oct. 15, 2019, the contents of each of which are incorporated by reference herein in their entirety.

TECHNICAL FIELD

This disclosure relates to automated docking of an unmanned aerial vehicle.

BACKGROUND

Previous base stations for unmanned aerial vehicles (e.g., a drone) typically consist of large enclosures that are at least three times larger, on a side, than the drone that they service. The drones typically rely on the availability of a very accurate global positioning system (GPS) position data to land somewhere within the large base station envelope and then rely on complex mechanical methods to align the drone on the landing pad to allow an articulated robotic arm to physically swap the drone's battery or some other scheme to connect the drone to a power supply able to recharge its battery. These previous systems are large, mechanically complex, expensive, and may not function properly in GPS denied environments.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
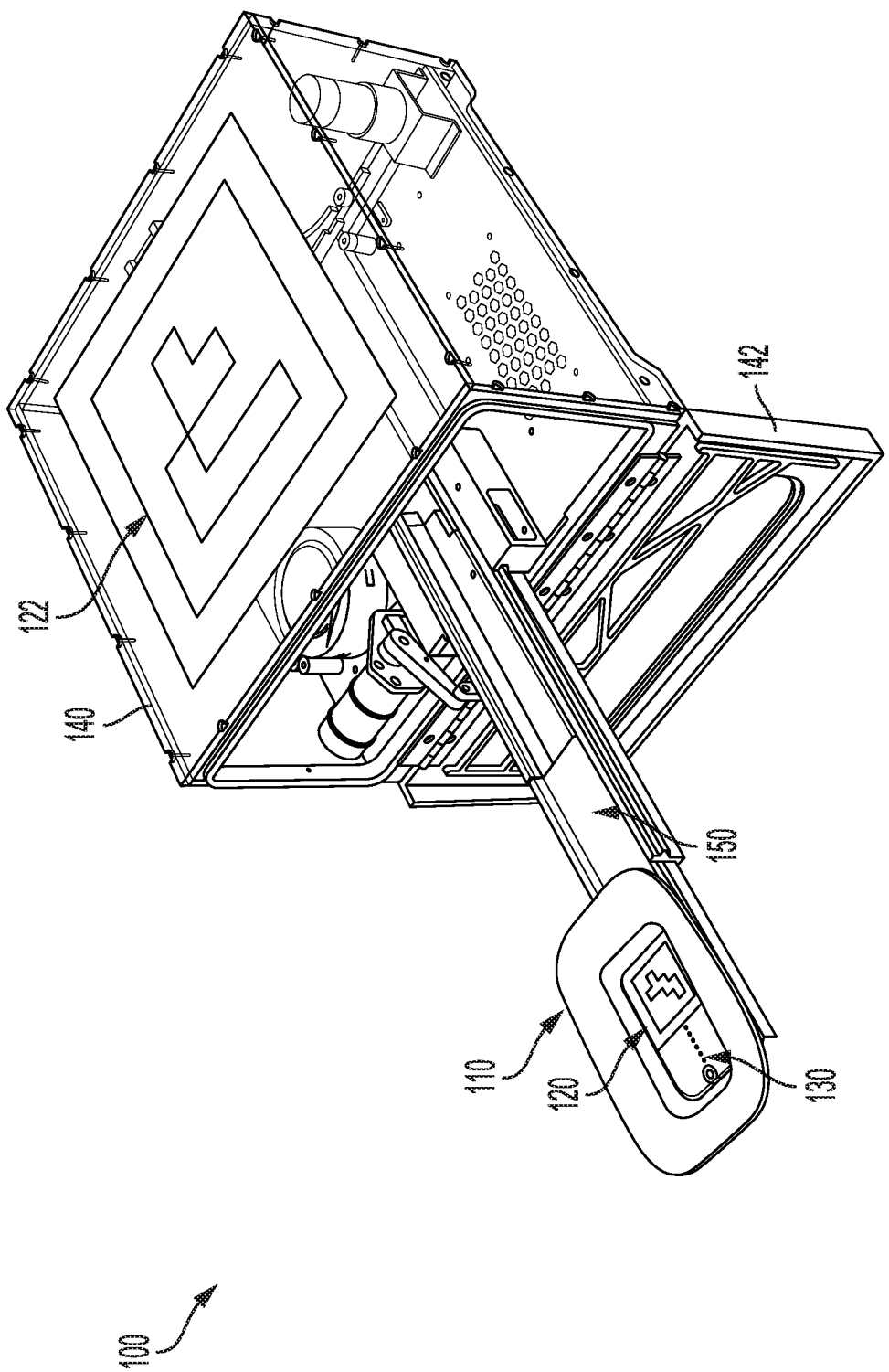
FIG. 1 is an illustration of an example of a dock for facilitating autonomous landing of an unmanned aerial vehicle.

Much of the value and challenges of autonomous unmanned aerial vehicles lies in enabling robust, fully autonomous missions. Disclosed herein is a dock platform that enables unmanned charging, takeoff, landing, and mission planning of an unmanned aerial vehicle (UAV). Some implementations enable the reliable operation of such a platform and the relevant application programming interface designs that make the system accessible by a wide variety of consumer and commercial applications.

One of the largest limiting factors for operating a drone is the battery. A typical drone can operate for 20-30 minutes before needing a fresh battery pack. This sets a limit on how long an autonomous drone can operate without human intervention. Once a battery pack is drained an operator has to land the drone and swap the pack for a fully charged one. While battery technology keeps improving and achieving higher energy densities, the improvements are incremental and may not paint a clear roadmap for sustained autonomous operation. An approach to alleviating the need for regular human intervention is to automate the battery management operation with some sort of automated base station.

Some methods disclosed herein leverage visual tracking and control software to be able to perform pin-point landings onto a much smaller target. By using visual fiducials to aid absolute position tracking relative to the base station, the UAV (e.g., a drone) may be able to reliably hit a 5 cm×5 cm target in a variety of environmental conditions. This means that the UAV can be very accurately positioned with the help of a small, passive funnel geometry that helps guide the UAV's battery, which extends below the rest of the UAV's structure, onto a set of charging contacts without the need for any complex actuation or large structure. This may enable a basic implementation of a base station to simply consist of a funnel shaped nest with a set of spring contacts and a visual tag within. To reduce the turbulent ground effect that a UAV typically encounters during landing, this nest can be elevated above the ground, and the profile of the nest itself can be made small enough to stay centered between the UAV's prop wash during landing. To allow reliable operation in GPS denied environments, a fiducial (e.g., a small visual tag) within the nest can be supplemented with a larger fiducial (e.g., a large visual tag) located somewhere outside the landing nest, such as on a flexible mat that can be rolled out on the ground near the base station, or attached to a wall nearby. The supplemental visual tag can be easily spotted by the UAV from a significant distance away in order to allow the UAV to reacquire its absolute position relative to the landing nest in a GPS denied environments regardless of any visual inertial odometry (VIO) navigational drift that may have built up over the course of the UAV's mission. Finally, in order for a UAV to be able to cover a large area, a reliable communications link with the UAV may be maintained. Since in most cases an ideal land-and-recharge location is not a good place to locate a transmitter, the communication circuitry may be placed in a separate range-extender module that can be ideally placed somewhere up high and central to the desired mission space for maximum coverage.

The simplicity and low cost of such a system makes up for the amount of time that the UAV is unavailable while its battery is recharged, when compared to a more complex and expensive battery swapping system. Intermittent operation is sufficient for a lot of use cases, and users that need more UAV coverage can simply increase UAV availability by adding another UAV and base station system. This approach of cheaper but more may be cost competitive with a large and expensive battery swapping system, and may also greatly increase system reliability by eliminating the ability of a single point of failure to take down the whole system.

For use cases where a UAV (e.g., a drone) needs to be sheltered from the elements but an existing structure with UAV access is not available, the UAV nest can be incorporated into a small custom shed. This shed may consist of roofed section that the UAV would land beneath attached to a roofless vestibule area that would act as a wind shelter and let the UAV enter and perform a precision landing even in high winds. One useful feature of such a shelter would be an open or vented section along the entire perimeter at the bottom of the walls that would let the drone's downdraft leave the structure instead of turbulently circulating within and negatively impacting stable flight.

For use cases where a UAV (e.g., a drone) needs to be secured more robustly from dust, cold, theft, etc. . . . a mechanized "drone in a box" enclosure may be used. For example, a drawer like box that is just slightly larger than the UAV itself may be used as a dock for the UAV. In some implementations, a motorized door on the side of the box can open 180 degrees to stay out of the downdraft of the UAV. For example, within the box, the charging nest may be mounted onto a telescoping linear slide that holds the UAV well clear of the box when the UAV is taking off or landing. In some implementations, once the UAV lands, the slide would pull the UAV back into the box while the UAV slowly spins the props backwards to fold them into the small space and move them out of the way of the door. This allows the box's footprint to be smaller than the area that the UAV sweeps out with its propellers. In some implementations, a two bar linkage connecting the door to its motor is designed to rotate past center in such a way that once closed, one cannot not back-drive the motor by pulling on the door from the outside, effectively locking the door. For example, the UAV may be physically secured within the nest by a linkage mechanism that would leverage the final centimeters of the slide's motion to press the UAV firmly into the nest with a soft roller (see, e.g., soft roller 310 in FIG. 3B). Once secured the box can be safely transported or even inverted without dislodging the UAV.

This actuated enclosure design may be shelf mounted or free standing on an elevated base that would ensure that the UAV is high enough above the ground to avoid ground effect during landing. The square profile of the box makes it simple to stack multiple boxes on top of each other for a multi-drone hive configuration, where each box is rotated 90° to the box below it so that multiple drones can take off and land at the same time without interfering with each other. Because the UAV is physically secured within the enclosure when the box is closed, the box can be mounted to a car or truck and avoid experiencing charging disruptions while the vehicle is moving. For example, in implementations where the UAV deploys sideways out of the box, the box can be flush mounted into a wall to ensure that is entirely out of the way when not landing or taking off.

When closed, the box can be made to have a very high ingress protection (IP) rating, and can be equipped with a rudimentary cooling and heating system to make the system function in many outdoor environments. For example, a high-efficiency particulate absorbing (HEPA) filter over an intake cooling fan may be used to protect the inside of the enclosure from dust in the environment. A heater built into the top of the box can melt away snow accumulation in wintery locations.

For example, the top and sides of the box can be made out of material that do not block radio frequencies, so that a version of the communications range extender can be incorporated within the box itself for mobile applications, and so that a UAV (e.g., a drone) can maintain GPS lock while charging and be able to deploy at a moments notice. In some implementations, a window may be incorporated into the door, or the door and the side panels of the box can be made transparent so that the UAV can see its surroundings before it deploys, and so that the UAV can act as its own security camera to deter theft or vandalism.

In some implementations, spring loaded micro-fiber wipers can be located inside the box in such a way that the navigational camera lenses are wiped clean whenever the drone slides into or out of the box. In some implementations, a small diaphragm pump inside the box can charge up a small pressure vessel that can then be used to clean all of the drone's lenses by blowing air at them through small nozzles within the box.

For example, the box can be mounted onto a car by way of three linear actuators concealed within a mounting base that would be able to lift and tilt the box at the time of launch or landing to compensate for the vehicle standing on a hilly street or uneven terrain.

In some implementations, the box can include a single or double door on the top of the box that once it slides or swings open allows the landing nest to extend up into the open air instead of out to the side. This would also take advantage of the UAV ability to land on a small target while away from any obstacles or surfaces that interfere with the UAV's propeller wash (which makes stable landing harder), and then once the UAV lands, the UAV and the nest may be retracted into a secure enclosure.

Software running on a processing apparatus in an unmanned aerial vehicle and/or on a processing apparatus in a dock for the UAV may be used to implement the autonomous landing techniques described herein.

For example, a robust estimation and re-localization procedure may include visual relocalization of a dock with a landing surface at multiple scales. For example, the UAV software may support a GPS->visual localization transition. In some implementations, arbitrary fiducial (e.g., visual tag) designs, sizes, and orientations around dock may be supported. For example, software may enable detection and rejection of spurious detections.

For example, a takeoff and landing procedure for UAV may include robust planning & control in wind using model-based wind estimation and/or model-based wind compensation. For example, a takeoff and landing procedure for UAV may include a landing "honing procedure," which may stop shortly above the landing surface of a dock. Since State estimation and visual detection is more accurate than control in windy environments, wait until the position, velocity, and angular error between the actual vehicle and fiducial on the landing surface is low before committing to land. For example, a takeoff and landing procedure for UAV may include a dock-specific landing detection and abort procedure. For example, actual contact with dock may be detected and the system may differentiate between a successful landing and a near-miss. For example, a takeoff and landing procedure for UAV may include employing a slow, reverse motor spin to enable self-retracting propellers.

In some implementations, a takeoff and landing procedure for UAV may include support for failure cases and fallback behavior, such as, setting a predetermined land position in the case of failure; going to another box; an option to land on top of dock if box is jammed, etc.

For example, an application programming interface design may be provided for single-drone, single-dock operation. For example, skills may be performed based on a schedule, or as much as possible given battery life or recharge rate.

For example, an application programming interface design for N drones with M docks operation nay be provided. In some implementations, mission parameters may be defined, such that, UAVs (e.g., drones) are automatically dispatched and recalled to constantly satisfy mission parameters with overlap.

An unmanned aerial vehicle (UAV) may be configured to automatically fold propellers to fit in the dock. For example, the dock may be smaller than the full UAV. Persistent operation can be achieved with multiple UAVs docking, charging, performing missions, waiting in standby to dock, and/or charging in coordination. In some implementations, a UAV is while it is in position within the dock. For example, automated servicing of a UAV may include: charging a battery, cleaning sensors, cleaning and/or drying the UAV more generally, changing a propeller, and/or changing a battery.

A UAV may track its state (e.g., a pose including a position and an orientation) using a combination of sensing modalities (e.g., visual inertial odometry (VIO) and global positioning system (GPS) based operation) to provide robustness against drift.

In some implementations, during takeoff and landing, as a UAV approaches the dock it constantly hones in on the landing spot. The honing process may make a takeoff and landing procedure robust against wind, ground effect, & other disturbances. For example, intelligent honing may use position, heading, and trajectory to get within a very tight tolerance. In some implementations, rear motors may reverse to get in.

Some implementations may provide advantages over earlier systems, such as; a small, inexpensive, and simple dock; retraction mechanism may allow for stacking and mitigate aerodynamic turbulence issues around landing; robust visual landing that may be more accurate; automated retraction of propeller to enable tight packing during charging, maintenance, and storage of UAV; vehicle may be serviced while docked without human intervention; persistent autonomous operation of multiple vehicles via dock, SDK, vehicles, & services (hardware & software).

FIG. 1 is an illustration of an example of a dock 100 for facilitating autonomous landing of an unmanned aerial vehicle. The dock 100 includes a landing surface 110 with a fiducial 120 and charging contacts 130 for a battery charger. The dock 100 includes a box 140 in the shape of a rectangular box with a door 142. The dock 100 includes a retractable arm 150 that supports the landing surface 110 and enables the landing surface 110 to be positioned outside the box 140, to facilitate takeoff and landing of an unmanned aerial vehicle, or inside the box 140, for storage and/or servicing of an unmanned aerial vehicle. The dock 100 includes a second, auxiliary fiducial 122 on the outer top surface of the box 140. The root fiducial 120 and the auxiliary fiducial 122 may be detected and used for visual localization of the unmanned aerial vehicle in relation the dock to enable a precise landing on a small landing surface 110. For example, the process 600 of FIG. 6 may be used to land an unmanned aerial vehicle on the landing surface 110 of the dock 100. For example, the process 900 of FIG. 9 may be used to land an unmanned aerial vehicle on the landing surface 110 of the dock 100. The dock 100 may include electronics, such as those depicted in FIG. 5 to control operation of the dock 100 and coordination with an unmanned aerial vehicle.

The dock 100 includes landing surface 110 configured to hold an unmanned aerial vehicle (e.g., the unmanned aerial vehicle 200 of FIG. 2) and a fiducial 120 on the landing surface 110. The landing surface 110 has a funnel geometry shaped to fit a bottom surface of the unmanned aerial vehicle at a base of the funnel. The tapered sides of the funnel may help to mechanically guide the bottom surface of the unmanned aerial vehicle into a centered position over the base of the funnel during a landing. For example, corners at the base of the funnel may server to prevent the aerial vehicle from rotating on the landing surface 110 after the bottom surface of the aerial vehicle has settled into the base of the funnel shape of the landing surface 110. For example, the fiducial 120 may include an asymmetric pattern that enables robust detection and determination of a pose (i.e., a position and an orientation) of the fiducial 120 relative to the unmanned aerial vehicle based on an image of the fiducial 120 captured with an image sensor of the unmanned aerial vehicle. For example, the fiducial 120 may include a visual tag from the AprilTag family.

The dock 100 includes conducting contacts 130 of a battery charger on the landing surface 110, positioned at the bottom of the funnel. The dock 100 includes a charger configured to charge the battery while the unmanned aerial vehicle is on the landing surface 110.

The dock 100 includes a box 140 configured to enclose the landing surface 110 in a first arrangement (shown in FIG. 4) and expose the landing surface 110 in a second arrangement (shown in FIGS. 1 and 3). The dock 100 may be configured to transition from the first arrangement to the second arrangement automatically by performing steps including opening a door 142 of the box 140 and extending the retractable arm 150 to move the landing surface 110 from inside the box 140 to outside of the box 140. The auxiliary fiducial 122 is located on an outer surface of the box 140.

The dock 100 includes a retractable arm 150 and the landing surface 110 is positioned at an end of the retractable arm 150. When the retractable arm 150 is extended, the landing surface 110 is positioned away from the box 140 of the dock 100, which may reduce or prevent propeller wash from the propellers of an unmanned aerial vehicle during a landing, thus simplifying the landing operation. The retractable arm 150 may include aerodynamic cowling for redirecting propeller wash to further mitigate the problems of propeller wash during landing.

For example the fiducial 120 may be a root fiducial, and the auxiliary fiducial 122 is larger than the root fiducial 120 to facilitate visual localization from farther distances as an unmanned aerial vehicle approaches the dock 100. For example, the area of the auxiliary fiducial 122 may be 25 times the area of the root fiducial 120. For example, the auxiliary fiducial 122 may include an asymmetric pattern that enables robust detection and determination of a pose (i.e., a position and an orientation) of the auxiliary fiducial 122 relative to the unmanned aerial vehicle based on an image of the auxiliary fiducial 122 captured with an image sensor of the unmanned aerial vehicle. For example, the auxiliary fiducial 122 may include a visual tag from the AprilTag family. For example, a processing apparatus (e.g., the processing apparatus 510) of the unmanned aerial vehicle may be configured to detect the auxiliary fiducial 122 in at least one of one or more images captured using an image sensor of the unmanned aerial vehicle; determine a pose of the auxiliary fiducial 122 based on the one or more images; and control, based on the pose of the auxiliary fiducial, the propulsion mechanism to cause the unmanned aerial vehicle to fly to a first location in a vicinity of the landing surface 110. Thus, the auxiliary fiducial 122 may facilitate the unmanned aerial vehicle getting close enough to the landing surface 110 to enable detection of the root fiducial 120.

Figure 2:
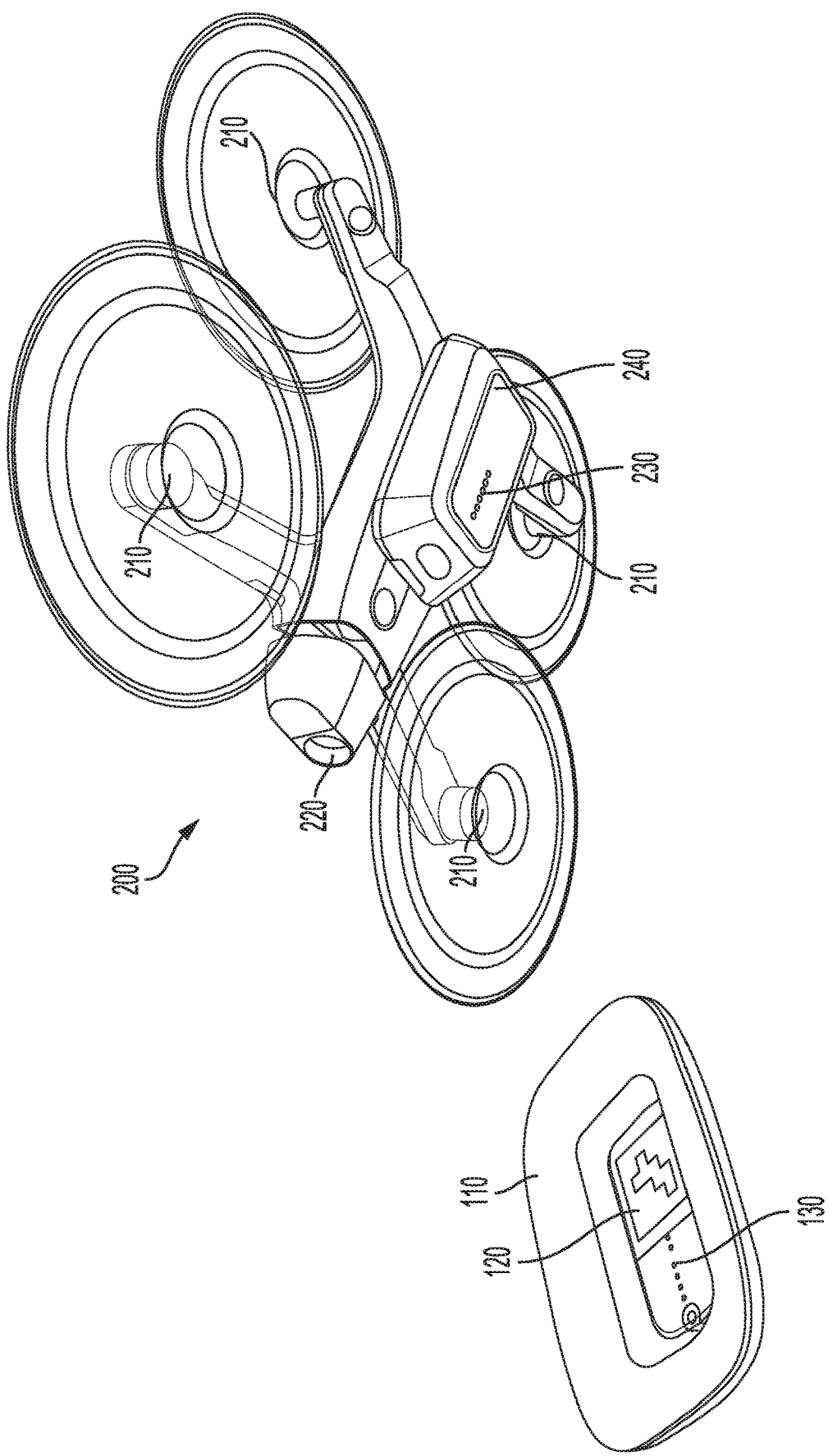
FIG. 2 is an illustration of an example of an unmanned aerial vehicle configured for autonomous landing on a landing surface.

FIG. 2 is an illustration of an example of an unmanned aerial vehicle 200 configured for autonomous landing on a landing surface 110. The unmanned aerial vehicle 200 includes a propulsion mechanism 210, an image sensor 220, and processing apparatus (e.g., the processing apparatus 410) (not shown in FIG. 2). The unmanned aerial vehicle 200 also includes a battery in battery pack 240 attached on the bottom of the unmanned aerial vehicle 200, with conducting contacts 230 to enable battery charging. A zoomed illustration of the landing surface 110 of FIG. 1 is reproduced in FIG. 2 to aid visualization of the intended connection. For example, the process 600 of FIG. 6 may be used to land an unmanned aerial vehicle 200 on the landing surface 110 of the dock 100. For example, the process 900 of FIG. 9 may be used to land the unmanned aerial vehicle 200 on the landing surface 110 of the dock 100. The unmanned aerial vehicle 200 may include electronics, such as those depicted in FIG. 4 to control operation of the unmanned aerial vehicle 200 and coordination with a dock 100.

The bottom surface of the battery pack 240 is a bottom surface of the unmanned aerial vehicle 200. The battery pack 240 is shaped to fit on the landing surface 110 at the bottom of the funnel shape. As the unmanned aerial vehicle 200 makes its final approach to the landing surface 110, the bottom of the battery pack 240 will make contact with landing surface 110 and be mechanically guided by the tapered sides of the funnel to a centered location at the bottom of the funnel. When the landing is complete, the conducting contacts of the battery pack 240 may come into contact with the conducting contacts 130 on the landing surface 110, making electrical connections to enable charging of the battery of the unmanned aerial vehicle 200. The dock 100 may include a charger configured to charge the battery while the unmanned aerial vehicle 200 is on the landing surface 110.

The unmanned aerial vehicle 200 includes a propulsion mechanism 210. In this example, the propulsion mechanism 210 includes propellers. For example, the unmanned aerial vehicle 200 may be a quad-copter drone. In some implementations, the processing apparatus in configured to automatically fold the propellers when entering the dock 100, which may allow the dock to have a smaller footprint than the area swept out by the propellers of the propulsion mechanism 210.

Figure 3A:
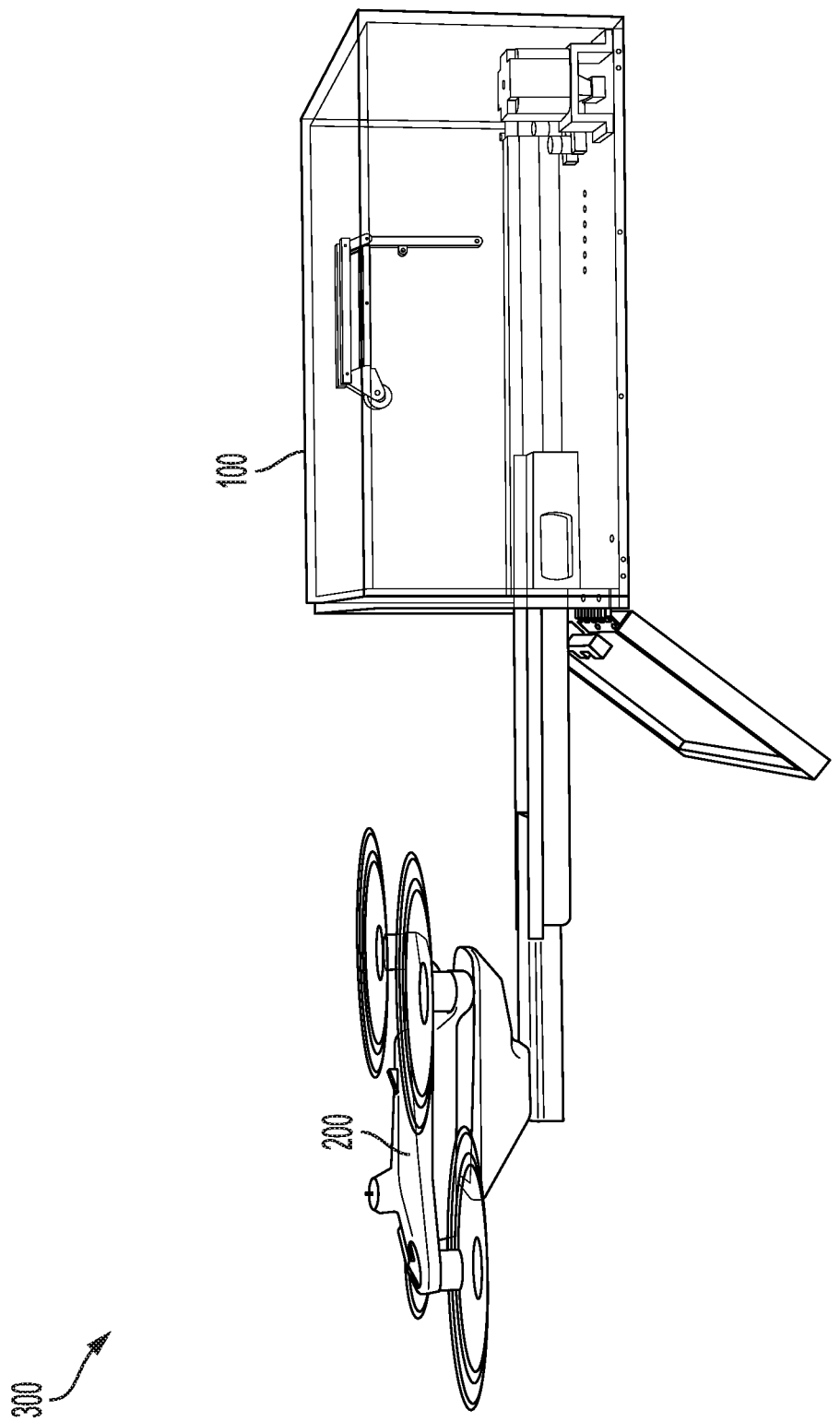
FIG. 3A is an illustration of an example of system for facilitating autonomous landing of an unmanned aerial vehicle.

FIG. 3A is an illustration of an example of system 300 for facilitating autonomous landing of an unmanned aerial vehicle 200. The system 300 includes the unmanned aerial vehicle 200 of FIG. 2 and the dock 100 of FIG. 1. FIG. 3A depicts the dock 100 in an arrangement with its door 142 open and its retractable arm 150 extended to facilitate takeoff and landing. The unmanned aerial vehicle 200 is resting on the landing surface 110 of the dock 100. This scene could be just before takeoff or just after landing.

Figure 3B:
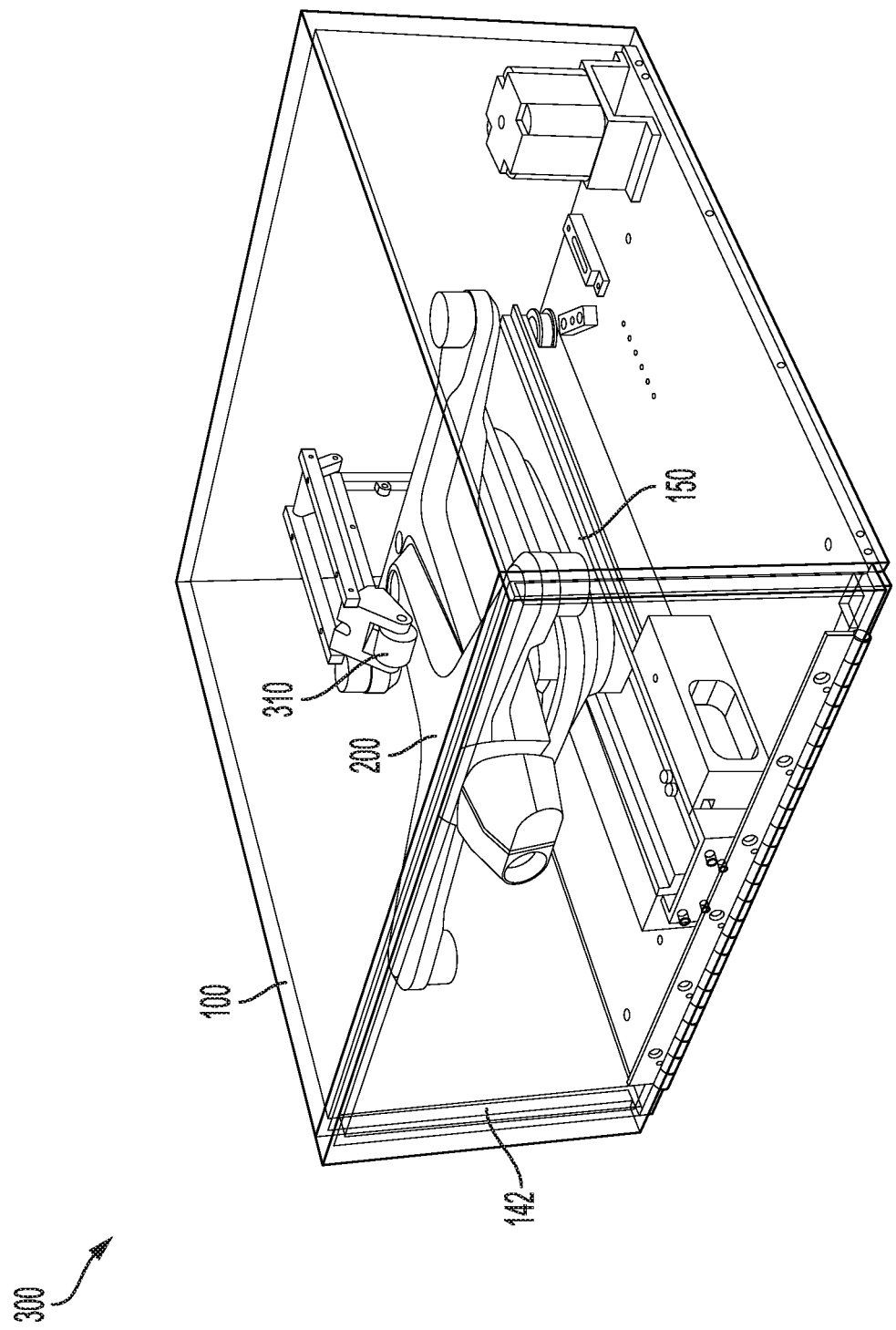
FIG. 3B is an illustration of an example of system for facilitating autonomous landing of an unmanned aerial vehicle with the unmanned aerial vehicle enclosed within a dock.

After landing, the retractable arm 150 may be contracted to pull the unmanned aerial vehicle 200 inside of the box 140 of the dock 100 to transition to the arrangement depicted in FIG. 3B. The processing apparatus (e.g., the processing apparatus 410) of the unmanned aerial vehicle 200 may be configured to automatically fold the propellers by turning the propellers while the retractable arm 150 is being retracted to pull the unmanned aerial vehicle 200 on the landing surface 110 into the box 140. For example, the slowly turning propellers may press against the sides of the box 140 as the unmanned aerial vehicle 200 slides into the box 140, which may cause the blades of the propellers to be folded together.

FIG. 3B is an illustration of an example of a system 300 for facilitating autonomous landing of an unmanned aerial vehicle 200 with the unmanned aerial vehicle 200 enclosed within a dock 100. FIG. 3B depicts the dock 100 in an arrangement with its door 142 closed and its retractable arm 150 contracted to facilitate storage and/or maintenance of the unmanned aerial vehicle 200. The unmanned aerial vehicle 200 is resting on the landing surface 110, inside the box 140 of the dock 100. The dock 100 includes a soft roller 310 attached to a top interior surface of the box 140 that is positioned to engage with a body of the unmanned aerial vehicle 200 as the unmanned aerial vehicle 200 is pulled into a resting position inside the box 140 by the retractable arm 150. The downward pressure from the soft roller 310 may press the unmanned aerial vehicle 200 down into the landing surface 110 and hold it securely in place. This may prevent the unmanned aerial vehicle 200 from becoming dislodged in the box 140 and interrupting the connection between the battery of the unmanned aerial vehicle 200 and the charger of the dock 100. This may allow the system 300 to transported safely (e.g., in a car, a truck, or another large vehicle).

Although not shown in FIG. 3B, in some implementations, the dock 100 includes components configured to automatically clean parts (e.g., a lens) of the unmanned aerial vehicle 200. For example, the dock 100 may include one or more pneumatic blowers positioned to blow air on a lens of the unmanned aerial vehicle 200 that covers the image sensor 220 while the unmanned aerial vehicle 200 is on the landing surface 110. For example, the dock 100 may include one or more spring loaded micro-fiber wipers positioned to wipe clean a lens of the unmanned aerial vehicle 200 that covers the image sensor 220 whenever the unmanned aerial vehicle 200 slides into or out of the box 140.

Figure 4:
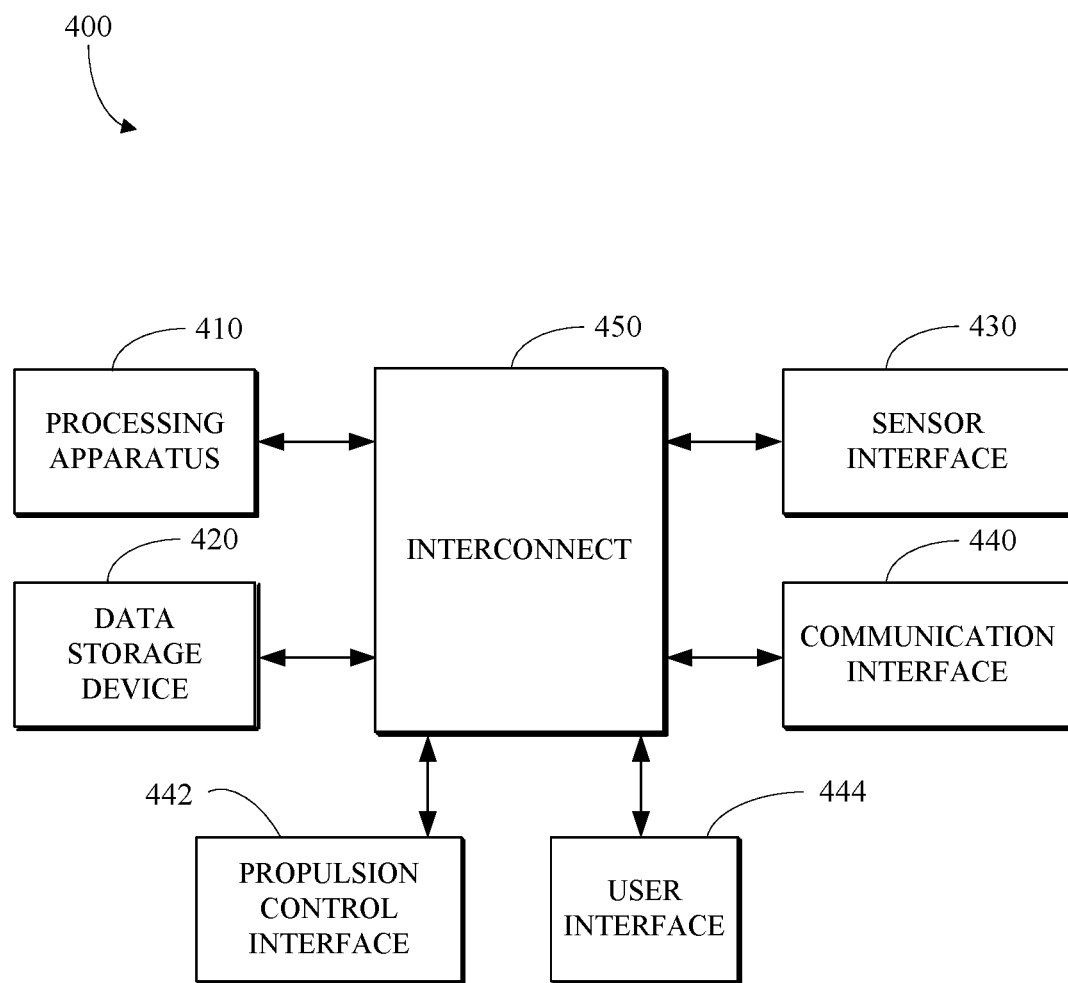
FIG. 4 is a block diagram of an example of a hardware configuration of an unmanned aerial vehicle.

FIG. 4 is a block diagram of an example of a hardware configuration of an unmanned aerial vehicle 400. The hardware configuration may include a processing apparatus 410, a data storage device 420, a sensor interface 430, a communications interface 440, propulsion control interface 442, a user interface 444, and an interconnect 450 through which the processing apparatus 410 may access the other components. For example, the unmanned aerial vehicle 400 may be or be part of an unmanned aerial vehicle (e.g., the unmanned aerial vehicle 200). The unmanned aerial vehicle 400 may be configured to detect one or more fiducials on a dock (e.g., the dock 100) use estimates of the pose of the one or more fiducials to land on a small landing surface to facilitate automated maintenance of the unmanned aerial vehicle 400. For example, the unmanned aerial vehicle 400 may be configured to implement the process 600 of FIG. 6, and/or the process 900 of FIG. 9.

The processing apparatus 410 is operable to execute instructions that have been stored in a data storage device 420. In some implementations, the processing apparatus 410 is a processor with random access memory for temporarily storing instructions read from the data storage device 420 while the instructions are being executed. The processing apparatus 410 may include single or multiple processors each having single or multiple processing cores. Alternatively, the processing apparatus 410 may include another type of device, or multiple devices, capable of manipulating or processing data. For example, the data storage device 420 may be a non-volatile information storage device such as, a solid-state drive, a read-only memory device (ROM), an optical disc, a magnetic disc, or any other suitable type of storage device such as a non-transitory computer readable memory. The data storage device 420 may include another type of device, or multiple devices, capable of storing data for retrieval or processing by the processing apparatus 410. The processing apparatus 410 may access and manipulate data stored in the data storage device 420 via interconnect 450. For example, the data storage device 420 may store instructions executable by the processing apparatus 410 that upon execution by the processing apparatus 410 cause the processing apparatus 410 to perform operations (e.g., operations that implement the process 600 of FIG. 6, and/or the process 900 of FIG. 9).

The sensor interface 430 may be configured to control and/or receive data (e.g., temperature measurements, pressure measurements, a global positioning system (GPS) data, acceleration measurements, angular rate measurements, magnetic flux measurements, and/or a visible spectrum image) from one or more sensors (e.g., including the image sensor 220). In some implementations, the sensor interface 430 may implement a serial port protocol (e.g., I2C or SPI) for communications with one or more sensor devices over conductors. In some implementations, the sensor interface 430 may include a wireless interface for communicating with one or more sensor groups via low-power, short-range communications (e.g., a vehicle area network protocol).

The communications interface 440 facilitates communication with other devices, for example, a paired dock (e.g., the dock 100), a specialized controller, or a user computing device (e.g., a smartphone or tablet). For example, the communications interface 440 may include a wireless interface, which may facilitate communication via a Wi-Fi network, a Bluetooth link, or a ZigBee link. For example, the communications interface 440 may include a wired interface, which may facilitate communication via a serial port (e.g., RS-232 or USB). The communications interface 440 facilitates communication via a network.

The propulsion control interface 442 may be used by the processing apparatus to control a propulsion system (e.g., including one or more propellers driven by electric motors). For example, the propulsion control interface 442 may include circuitry for converting digital control signals from the processing apparatus 410 to analog control signals for actuators (e.g., electric motors driving respective propellers). In some implementations, the propulsion control interface 442 may implement a serial port protocol (e.g., I2C or SPI) for communications with the processing apparatus 410. In some implementations, the propulsion control interface 442 may include a wireless interface for communicating with one or more sensor groups via low-power, short-range communications (e.g., a vehicle area network protocol).

The user interface 444 allows input and output of information from/to a user. In some implementations, the user interface 444 can include a display, which can be a liquid crystal display (LCD), a light emitting diode (LED) display (e.g., an OLED display), or other suitable display. For example, the user interface 444 may include a touchscreen. For example, the user interface 444 may include buttons. For example, the user interface 444 may include a positional input device, such as a touchpad, touchscreen, or the like; or other suitable human or machine interface devices.

For example, the interconnect 450 may be a system bus, or a wired or wireless network (e.g., a vehicle area network). In some implementations (not shown in FIG. 4), some components of the unmanned aerial vehicle 400 may be omitted, such as the user interface 444.

Figure 5:
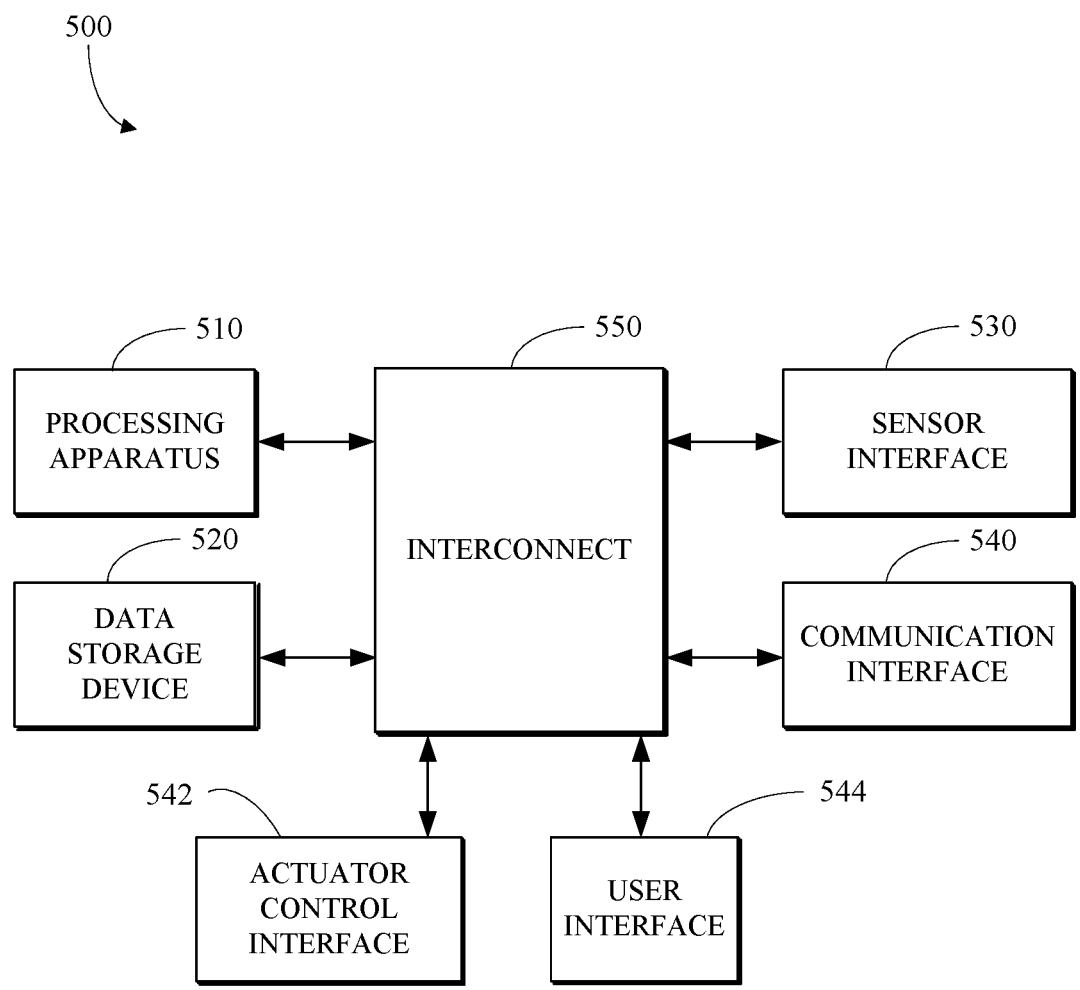
FIG. 5 is a block diagram of an example of a hardware configuration of a dock for an unmanned aerial vehicle.

FIG. 5 is a block diagram of an example of a hardware configuration of a dock 500 for an unmanned aerial vehicle. The hardware configuration may include a processing apparatus 510, a data storage device 520, a sensor interface 530, a communications interface 540, actuator control interface 542, a user interface 544, and an interconnect 550 through which the processing apparatus 510 may access the other components. For example, the dock 500 may be or be part of dock (e.g., the dock 100). The dock 500 may be configured to receive an unmanned aerial vehicle (e.g., the unmanned aerial vehicle 200) on a small landing surface to facilitate automated maintenance (e.g., charging and/or cleaning) of the unmanned aerial vehicle.

The processing apparatus 510 is operable to execute instructions that have been stored in a data storage device 520. In some implementations, the processing apparatus 510 is a processor with random access memory for temporarily storing instructions read from the data storage device 520 while the instructions are being executed. The processing apparatus 510 may include single or multiple processors each having single or multiple processing cores. Alternatively, the processing apparatus 510 may include another type of device, or multiple devices, capable of manipulating or processing data. For example, the data storage device 520 may be a non-volatile information storage device such as, hard drive, a solid-state drive, a read-only memory device (ROM), an optical disc, a magnetic disc, or any other suitable type of storage device such as a non-transitory computer readable memory. The data storage device 520 may include another type of device, or multiple devices, capable of storing data for retrieval or processing by the processing apparatus 510. The processing apparatus 510 may access and manipulate data stored in the data storage device 520 via interconnect 550. For example, the data storage device 520 may store instructions executable by the processing apparatus 510 that upon execution by the processing apparatus 510 cause the processing apparatus 510 to perform operations (e.g., opening or closing a door, extending or contracting a retractable arm, charging a battery, or cleaning a part of a UAV).

The sensor interface 530 may be configured to control and/or receive data (e.g., temperature measurements, pressure measurements, a global positioning system (GPS) data, acceleration measurements, angular rate measurements, magnetic flux measurements, and/or a visible spectrum image) from one or more sensors (e.g., including the image sensor 220). In some implementations, the sensor interface 530 may implement a serial port protocol (e.g., I2C or SPI) for communications with one or more sensor devices over conductors. In some implementations, the sensor interface 530 may include a wireless interface for communicating with one or more sensor groups via low-power, short-range communications (e.g., a vehicle area network protocol).

The communications interface 540 facilitates communication with other devices, for example, a paired UAV (e.g., the unmanned aerial vehicle 200), a specialized controller, or a user computing device (e.g., a smartphone or tablet). For example, the communications interface 540 may include a wireless interface, which may facilitate communication via a Wi-Fi network, a Bluetooth link, or a ZigBee link. For example, the communications interface 540 may include a wired interface, which may facilitate communication via a serial port (e.g., RS-232 or USB). The communications interface 540 facilitates communication via a network.

The actuator control interface 542 may be used by the processing apparatus to control one or more actuators (e.g., an electric motor driving the retractable arm 150). For example, the actuator control interface 542 may include circuitry for converting digital control signals from the processing apparatus 510 to analog control signals for actuators (e.g., an electric motor driving the opening and closing of the door 142 or a pneumatic sprayer). In some implementations, the actuator control interface 542 may implement a serial port protocol (e.g., I2C or SPI) for communications with the processing apparatus 510. In some implementations, the actuator control interface 542 may include a wireless interface for communicating with one or more sensor groups via low-power, short-range communications.

The user interface 544 allows input and output of information from/to a user. In some implementations, the user interface 544 can include a display, which can be a liquid crystal display (LCD), a light emitting diode (LED) display (e.g., an OLED display), or other suitable display. For example, the user interface 544 may include a touchscreen. For example, the user interface 544 may include buttons. For example, the user interface 544 may include a positional input device, such as a touchpad, touchscreen, or the like; or other suitable human or machine interface devices.

For example, the interconnect 550 may be a system bus, or a wired or wireless network (e.g., a vehicle area network). In some implementations (not shown in FIG. 5), some components of the dock 500 may be omitted, such as the user interface 544.

Figure 6:
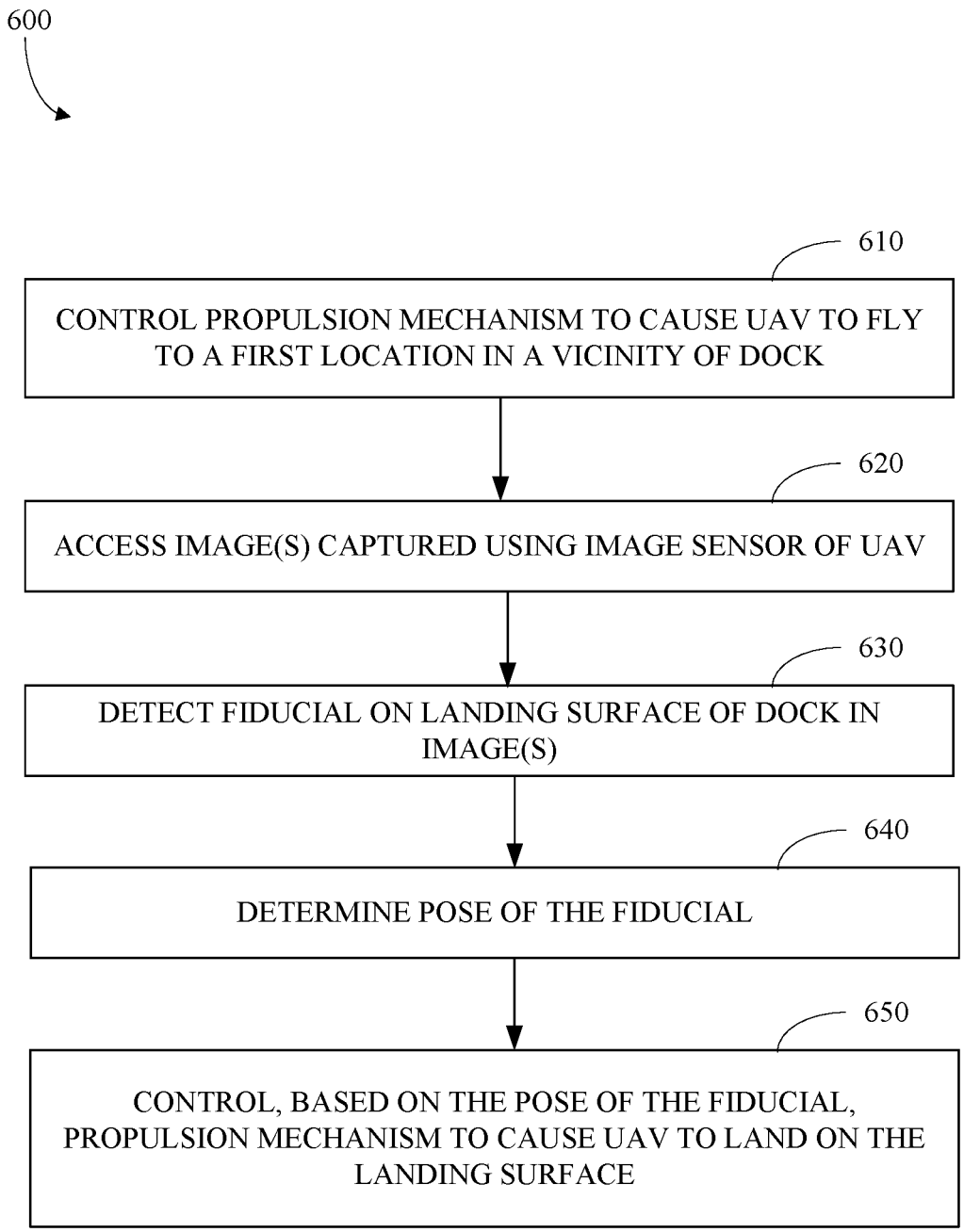
FIG. 6 is a flowchart of an example of a process for autonomously landing an unmanned aerial vehicle using at least one fiducial on a landing surface.

FIG. 6 is a flowchart of an example of a process 600 for autonomously landing an unmanned aerial vehicle using at least one fiducial on a landing surface. The process 600 includes controlling 610 an unmanned aerial vehicle to fly to a first location in a vicinity of a dock that includes a landing surface for the unmanned aerial vehicle with a fiducial; accessing 620 one or more images captured using an image sensor of the unmanned aerial vehicle; detecting 630 a fiducial in at least one of the one or more images, determining 640 a pose of the fiducial based on the one or more images; and controlling 650, based on the pose of the fiducial, the propulsion mechanism to cause the unmanned aerial vehicle to land on the landing surface. For example, the process 600 may be implemented by the unmanned aerial vehicle 200. For example, the process 600 may be implemented by the unmanned aerial vehicle 400.

The process 600 includes controlling 610 a propulsion mechanism of an unmanned aerial vehicle (e.g., the unmanned aerial vehicle 200) to cause the unmanned aerial vehicle to fly to a first location in a vicinity of a dock (e.g., a funnel shaped nest or the dock 100) that includes a landing surface (e.g., the landing surface 110) configured to hold the unmanned aerial vehicle and a fiducial (e.g., the fiducial 120) on the landing surface. For example, the unmanned aerial vehicle may have stored GPS coordinates of the dock and use GPS data and/or visual inertial odometry to navigate to location in the vicinity of the dock 100. The resolution of these localization techniques may be insufficient to localize with sufficient precision to land on a small landing surface of the dock, but may be sufficient to get within sight of the dock or associated auxiliary fiducials. In some implementations, the dock's location in the navigation frame can be used to save a corresponding GPS (lat, long) coordinate. This coordinate is global and thus not prone to VIO drift. When returning to the dock, the drone can first fly to the GPS coordinate (~3-5 m accuracy), then use visual detections of one or more fiducials to further hone into the dock. For example, a processing apparatus (e.g., the processing apparatus 410) may use a propulsion controller interface (e.g., the propulsion control interface 442 to control 610 the propulsion system (e.g., one or more propellers driven by electric motors).

The process 600 includes accessing 620 one or more images captured using an image sensor (e.g., the image sensor 220) of the unmanned aerial vehicle. For example, the one or more images may include a sequence of images (e.g., frames of video) captured as the unmanned aerial vehicle flies toward the landing surface of the dock. For example, the one or more images may include an infrared image and/or a visible spectrum image. The one or more images may be subject to varying amounts of processing prior to being accessed 620. For example, pre-processing of the one or more images may combine image data from multiple sources (e.g., stitching images from multiple images sensors on the unmanned aerial vehicle. The one or more images may be accessed 620 in variety of ways. For example, the one or more images may be accessed 620 by reading directly from an image sensor via a sensor interface (e.g., the sensor interface 430) or from a memory (e.g., the data storage device 420) via an interconnect (e.g., the interconnect 450).

The process 600 includes detecting 630 the fiducial in at least one of the one or more images. For example, computer vision techniques may be applied to detect 630 the fiducial in one of the one or more images. In some implementations, additional auxiliary fiducials at one or more larger scales are associated with the dock and can be used for visual localization to navigate closer to the dock and get close enough to capture a view of the smallest fiducial, the root fiducial, that is located directly on the small landing surface. An example of the use of an auxiliary fiducial at a larger scale is described in relation to FIG. 9.

The process 600 includes determining 640 a pose of the fiducial based on the one or more images. The pose may be relative to the unmanned aerial vehicle. In some implementations, a coordinate frame used to estimate the fiducial pose is the same navigation frame that is estimated using a visual inertial odometry (VIO) system (e.g., based images and inertial measurement unit data) that is running for normal flight. This may offer a low-drift inertial frame in which the camera images are aligned. For example, the detections 630 on dock-specific fiducials (e.g., visual markers) may happen in the respective camera's image, and a calibrated camera model is used to project those points into the navigation frame. If one or multiple fiducials are detected in the image, their three-dimensional positions and orientations are added to a dock-specific optimization problem that simultaneously optimizes for a small "root" fiducial that is right under the intended final resting position if the unmanned aerial vehicle, and the relative three-dimensional transformations (e.g., rotation and translation) between any auxiliary fiducials and the root fiducial. In some implementations, the fiducial (e.g., a visual tag) poses and their relative transforms are added as variables to a nonlinear optimization program. On a new observation of one or more fiducials, the optimization further refines these poses and transforms. The nonlinear optimization program may be implemented as a nonlinear estimation filter using visual tag data, visual inertial odometry (VIO) navigation system data, and GPS navigation system data to solve for tag and vehicle poses & transforms. If the drone flies for an extended period of time without seeing any of the fiducials, the navigation frame is prone to drift. The joint optimization problem allows recovery the positions of all of the fiducials, most importantly the root fiducial that on the landing surface, given a single observation of one of the fiducials. The sizes of the fiducials (e.g., visual tags) can be designed to offer different detection distances. The "root" fiducial (e.g., the fiducial 120) is the smallest. In some implementations, the landing procedure requires a certain threshold of fresh detections on the root fiducial itself in order to finalize landing. The final result is an updated estimate of the pose of the root fiducial relative to that is or can be used to determine its pose with respect to the unmanned aerial vehicle, which can be used to land the unmanned aerial vehicle on the landing surface (e.g., the landing surface 110) that is marked with the root fiducial.

The process 600 includes controlling 650, based on the pose of the fiducial, the propulsion mechanism to cause the unmanned aerial vehicle to land on the landing surface. In some implementations, a honing procedure using a specialized state machine is used to land the unmanned aerial vehicle on the landing surface. For example, the process 700 of FIG. 7 may be used to land the unmanned aerial vehicle. For example, a processing apparatus (e.g., the processing apparatus 410) may use a propulsion controller interface (e.g., the propulsion control interface 442 to control 650 the propulsion system (e.g., one or more propellers driven by electric motors) to land. In some implementations, the dock includes a retractable arm (e.g., the retractable arm 150) and the landing surface is positioned at an end of the retractable arm, which may serve to reduce propeller wash experienced during the landing motion.

Figure 7:
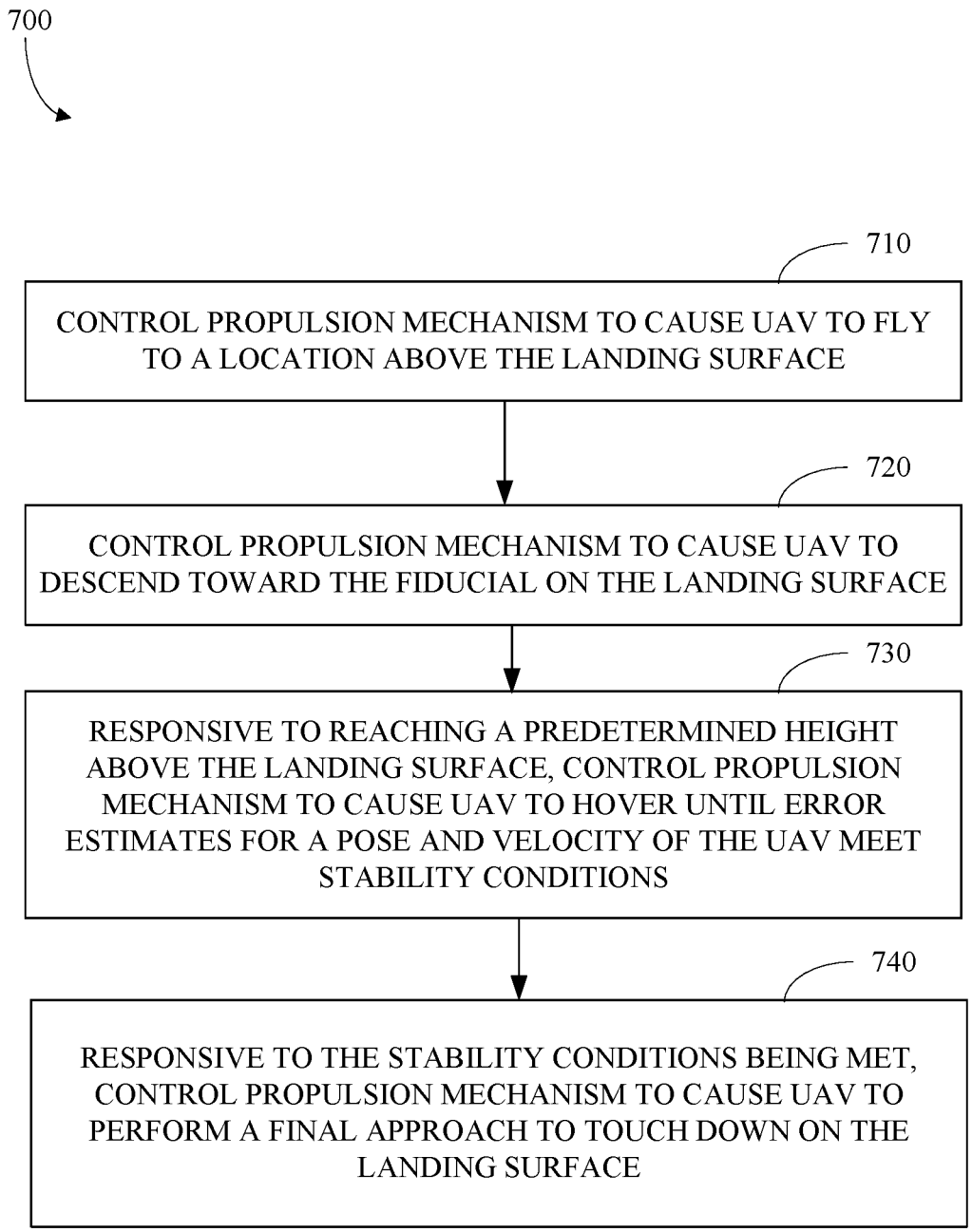
FIG. 7 is a flowchart of an example of a process for autonomously landing an unmanned aerial vehicle.

FIG. 7 is a flowchart of an example of a process 700 for autonomously landing an unmanned aerial vehicle. The process 700 includes controlling 710 the propulsion mechanism to fly to a location above the landing surface; controlling 720 the propulsion mechanism to cause the unmanned aerial vehicle to descend toward the fiducial on the landing surface; responsive to reaching a predetermined height above the landing surface, controlling 730 the propulsion mechanism to hover at the predetermined height above the landing surface until error estimates for a pose and velocity of the unmanned aerial vehicle meet stability conditions; and responsive to the stability conditions being met, controlling 740 the propulsion mechanism to perform a final approach to touch down on the landing surface. For example, the process 700 may be used to hone an estimate of the pose of the root fiducial as you approach the final landing motion. For example, the process 700 may be implemented by the unmanned aerial vehicle 200. For example, the process 700 may be implemented by the unmanned aerial vehicle 400.

The process 700 includes controlling 710 the propulsion mechanism to cause the unmanned aerial vehicle (e.g., the unmanned aerial vehicle 200) to fly to a location above the landing surface (e.g., the landing surface 110). For example, a processing apparatus (e.g., the processing apparatus 410) may use a propulsion controller interface (e.g., the propulsion control interface 442 to control 650 the propulsion system (e.g., one or more propellers driven by electric motors) to fly to the location above the landing surface.

The process 700 includes controlling 720 the propulsion mechanism to cause the unmanned aerial vehicle to descend toward the fiducial (e.g., the fiducial 120) on the landing surface. For example, a processing apparatus (e.g., the processing apparatus 410) may use a propulsion controller interface (e.g., the propulsion control interface 442 to control 650 the propulsion system (e.g., one or more propellers driven by electric motors) to descend toward the fiducial on the landing surface. For example, the fiducial may be root fiducial, and in some implementations, detections of auxiliary fiducials continue to be used together with detections of the root fiducial to update a joint model of the pose of the root fiducial. In some implementations, during the decent, with the root fiducial fully in view, only detections of the root fiducial are used to update estimates of the pose of the root fiducial that is used for landing, while detections of larger auxiliary fiducials are ignored. In some implementations, during the descent phase, the unmanned aerial vehicle slowly approaches the root fiducial and monitors the health of the detection system (e.g., an estimated variance of the dock location, the age of the latest visual detection was on the auxiliary tags, and/or the age and number of detections on the root tag).

The process 700 includes, responsive to reaching a predetermined height above the landing surface, controlling the propulsion mechanism to cause the unmanned aerial vehicle to hover at the predetermined height (e.g., 5 centimeters) above the landing surface until error estimates for a pose and velocity of the unmanned aerial vehicle meet stability conditions. The final approach for landing is a critical stage of the landing process, so it may be beneficial wait for your state estimates to converge under favorable conditions before making the final approach. In some implementations, during the hover phase, the unmanned aerial vehicle waits close to the root fiducial for the unmanned aerial vehicle's position, velocity, and orientation error to be small enough to transition to the final approach.

The process 700 includes, responsive to the stability conditions being met, controlling 740 the propulsion mechanism to cause the unmanned aerial vehicle to perform a final approach to touch down on the landing surface. For example, a final approach sequence may be faster than the descent, and aimed at completing the landing onto the landing surface of the dock. For example, the process 800 of FIG. 8 may be implemented when performing a final approach.

Figure 8:
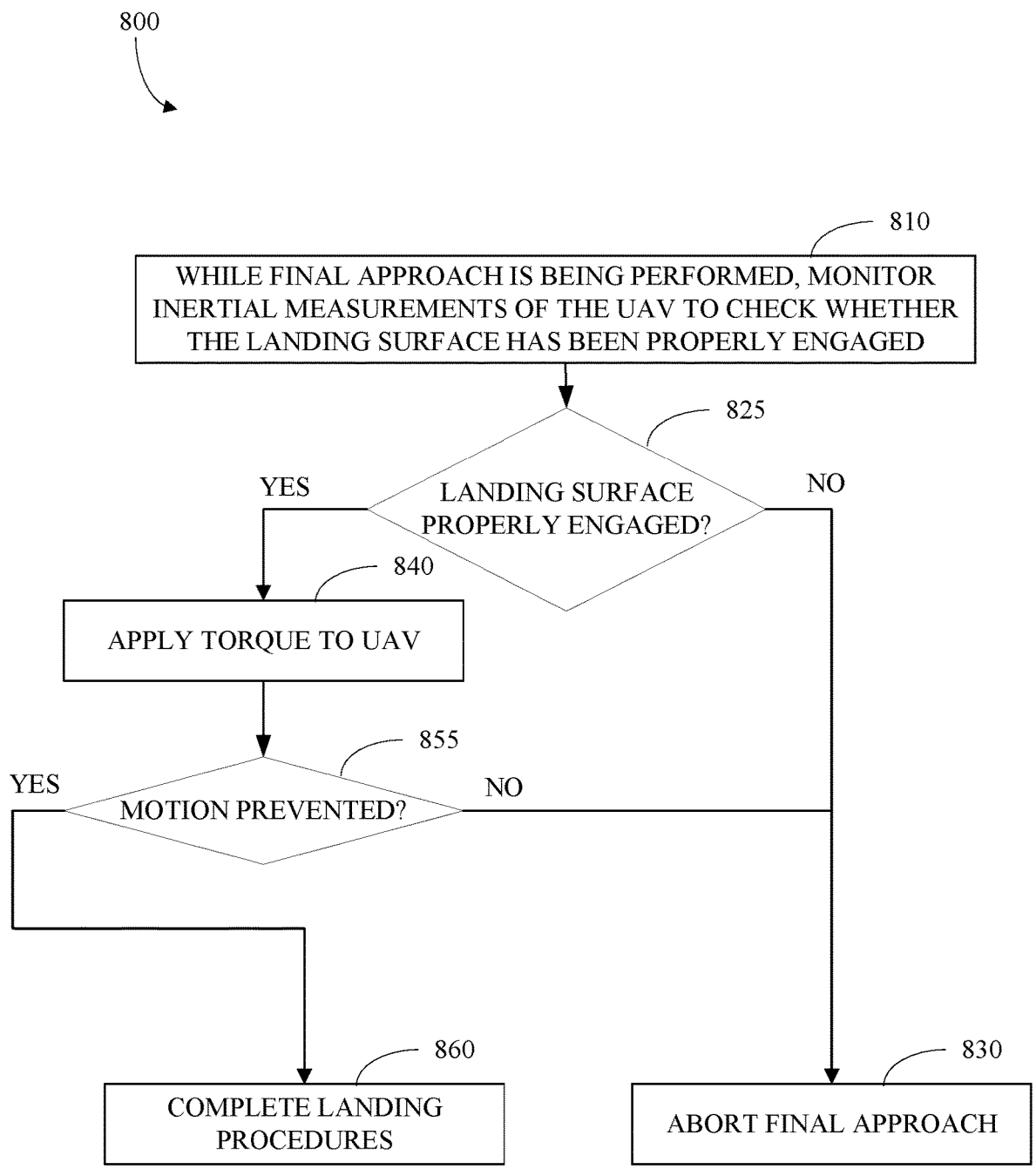
FIG. 8 is a flowchart of an example of a process for performing a final approach to autonomously land an unmanned aerial vehicle.

FIG. 8 is a flowchart of an example of a process 800 for performing a final approach to autonomously land an unmanned aerial vehicle. There are specific cues that can be used to detect the difference between a proper dock landing and a near miss/unseated landing. Generally, landing detection is done by computing the difference between the expected aerodynamic forces on the vehicle due to the drone's rotor rates, and the forces estimated by an inertial measurement unit (IMU) of the unmanned aerial vehicle. Since the landing surface (e.g., the landing surface 110) cradles the drone in a specific way, we can passively sense the forces imparted by the dock on the body of the unmanned aerial vehicle. In some implementations, torque may also be actively injected into the vehicle body through the controls system to look for vehicle movement in order to better sense the contours of the landing surface.

The process 800 includes, while the final approach is being performed, monitor inertial measurements (e.g., accelerations and angular rates) of the unmanned aerial vehicle to check 810 whether the landing surface has been properly engaged. The shock of contact with the landing surface (e.g., the landing surface 110) may produce characteristic forces on the unmanned aerial vehicle and these forces may be reflected in inertial data. For example, the inertial measurement data may be compared to thresholds corresponding to expected ranges of these parameters associated with a proper engagement of the landing surface. For example, a machine learning module (e.g., a neural network) may be trained to distinguish based on inertial measurement data whether the landing surface has been properly engaged.

If (at step 825) the landing surface has not been properly engaged, then abort 830 the final approach. If (at step 825), the landing surface has been properly engaged, apply 840 a torque to the unmanned aerial vehicle using the propulsion system, and check 855 if the rotation of the unmanned aerial vehicle is prevented. If (at step 855) the rotation is not prevented, then abort 830 the final approach; and if (at step 855) the rotation is prevented (e.g. by the corners at the bottom of the funnel of the landing surface 110), then complete 860 the successful landing procedures.

After the unmanned vehicle has landed on the landing surface the dock (e.g., the dock 100) and the unmanned aerial vehicle may coordinate to complete 860 a landing procedure (e.g., to store and shut down the unmanned aerial vehicle and/or commence automated maintenance services (e.g., charging and/or cleaning) on the unmanned aerial vehicle. For example, the dock may include a box configured to enclose the landing surface in a first arrangement of the dock and expose the landing surface in a second arrangement of the dock. The dock may be configured to transition the dock from the first arrangement to the second arrangement automatically by performing steps including opening a door of the box and extending the retractable arm to move the landing surface from inside the box to outside of the box. In some implementations, the propulsion mechanism includes propellers, and the post landing procedures include automatically folding the propellers by turning the propellers while the retractable arm is being retracted to pull the unmanned aerial vehicle on the landing surface into the box. For example, the post-landing procedures may include automatically charging a battery of the unmanned aerial vehicle using a charger included in the dock while the unmanned aerial vehicle is on the landing surface. For example, the post-landing procedures may include automatically cleaning a lens of the unmanned aerial vehicle that covers the image sensor by using a pneumatic blower positioned in the dock to blow air on the lens while the unmanned aerial vehicle is on the landing surface.

The process 800 may include, responsive to a determination that the landing surface has not been properly engaged, aborting 830 the final approach by controlling the propulsion mechanism to cause the unmanned aerial vehicle to rise. For example, aborting 830 a landing may include turning on the controls system again and commanding a desired position above the dock. This can be flowed by various recovery methods, such as an abort sequence where the unmanned aerial vehicle leaves the vicinity of the dock and executes another pre-programmed plan (e.g., land on the ground next to the dock, go to another location, or go to another dock).

Figure 9:
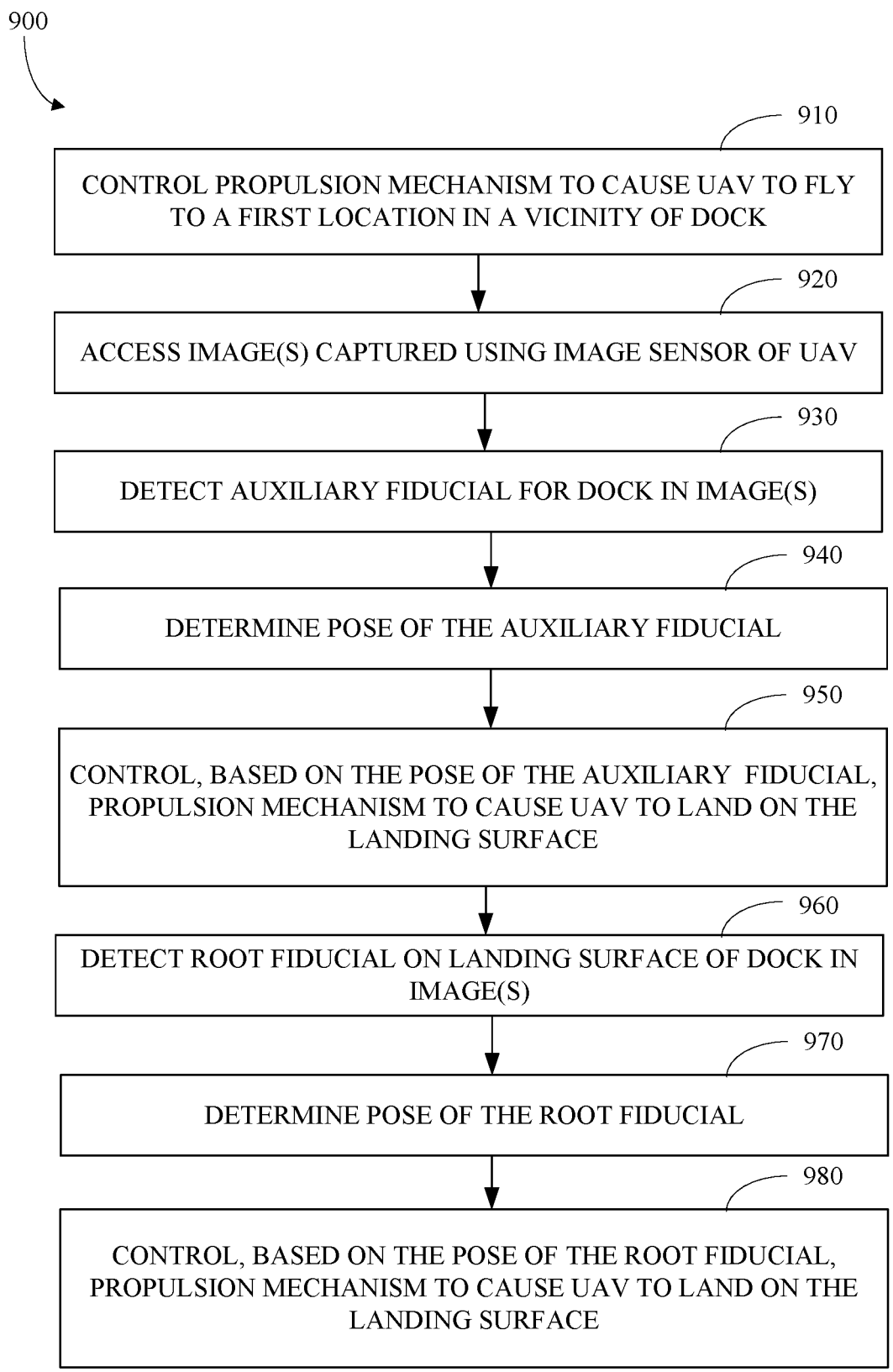
FIG. 9 is a flowchart of an example of a process for autonomously landing an unmanned aerial vehicle using a sequence of fiducials at different scales.

FIG. 9 is a flowchart of an example of a process 900 for autonomously landing an unmanned aerial vehicle using a sequence of fiducials at different scales. The process 900 includes controlling 910 an unmanned aerial vehicle to fly to a first location in a vicinity of a dock that includes a landing surface for the unmanned aerial vehicle with a fiducial; accessing 920 one or more images captured using an image sensor of the unmanned aerial vehicle; detecting 930 an auxiliary fiducial in at least one of the one or more images; determining 940 a pose of the auxiliary fiducial based on the one or more images; controlling 950, based on the pose of the auxiliary fiducial, the propulsion mechanism to fly to a first location in a vicinity of the landing surface; detecting 960 a root fiducial on a landing surface in at least one of the one or more images, determining 970 a pose of the root fiducial based on the one or more images; and controlling 980, based on the pose of the root fiducial, the propulsion mechanism to cause the unmanned aerial vehicle to land on the landing surface. For example, the process 900 may be implemented by the unmanned aerial vehicle 200. For example, the process 900 may be implemented by the unmanned aerial vehicle 400.

The process 900 includes controlling 910 a propulsion mechanism of an unmanned aerial vehicle (e.g., the unmanned aerial vehicle 200) to cause the unmanned aerial vehicle to fly to a first location in a vicinity of a dock (e.g., a funnel shaped nest or the dock 100) that includes a landing surface (e.g., the landing surface 110) configured to hold the unmanned aerial vehicle and a fiducial (e.g., the fiducial 120) on the landing surface. For example, the unmanned aerial vehicle may have stored GPS coordinates of the dock and use GPS data and/or visual inertial odometry to navigate to location in the vicinity of the dock 100. The resolution of these localization techniques may be insufficient to localize with sufficient precision to land on a small landing surface of the dock, but may be sufficient to get within sight of the dock or associated auxiliary fiducials. In some implementations, the dock's location in the navigation frame can be used to save a corresponding GPS (latitude, longitude) coordinate. This coordinate is global and thus not prone to VIO drift. When returning to the dock, the drone can first fly to the GPS coordinate (~3-5 m accuracy), then use visual detections of one or more fiducials to further hone into the dock. For example, a processing apparatus (e.g., the processing apparatus 410) may use a propulsion controller interface (e.g., the propulsion control interface 442 to control 910 the propulsion system (e.g., one or more propellers driven by electric motors).

The process 900 includes accessing 920 one or more images captured using an image sensor (e.g., the image sensor 220) of the unmanned aerial vehicle. For example, the one or more images may include a sequence of images (e.g., frames of video) captured as the unmanned aerial vehicle flies toward the landing surface of the dock. For example, the one or more images may include an infrared image and/or a visible spectrum image. The one or more images may be subject to varying amounts of processing prior to being accessed 920. For example, pre-processing of the one or more images may combine image data from multiple sources (e.g., stitching images from multiple images sensors on the unmanned aerial vehicle. The one or more images may be accessed 920 in variety of ways. For example, the one or more images may be accessed 920 by reading directly from an image sensor via a sensor interface (e.g., the sensor interface 430) or from a memory (e.g., the data storage device 420) via an interconnect (e.g., the interconnect 450).

The process 900 includes detecting 930 an auxiliary fiducial (e.g., the auxiliary fiducial 122) in at least one of the one or more images. The auxiliary fiducial may larger than a root fiducial, where the root fiducial is located on the landing surface of the dock. For example, computer vision techniques may be applied to detect 930 the auxiliary fiducial in one of the one or more images. For example, the auxiliary fiducial being larger than the root fiducial may enable it to be used for visual localization to navigate closer to the dock and get close enough to capture a view of the smallest fiducial, the root fiducial, that is located directly on the small landing surface. In some implementations, multiple auxiliary fiducials (e.g. visual tags) at different scales may be used to iterative zoom in closer and closer to the dock and ultimately to a direct view of the small landing platform on the dock and the root fiducial marking the final target for landing.

The process 900 includes determining 940 a pose of the auxiliary fiducial based on the one or more images. The pose may be relative to the unmanned aerial vehicle. In some implementations, a coordinate frame used to estimate the fiducial pose is the same navigation frame that is estimated using a visual inertial odometry (VIO) system (e.g., based images and inertial measurement unit data) that is running for normal flight. This may offer a low-drift inertial frame in which the camera images are aligned. For example, the detections 930 on dock-specific fiducials (e.g., visual markers) may happen in the respective camera's image, and a calibrated camera model is used to project those points into the navigation frame. If one or multiple fiducials are detected 930 in the image, their three-dimensional positions and orientations may be added to a dock-specific optimization problem that simultaneously optimizes for a small "root" fiducial that is right under the intended final resting position if the unmanned aerial vehicle, and the relative three-dimensional transformations (e.g., rotation and translation) between any auxiliary fiducials and the root fiducial. In some implementations, the fiducial (e.g., a visual tag) poses and their relative transforms are added as variables to a nonlinear optimization program. On a new observation of one or more fiducials, the optimization further refines these poses and transforms. The nonlinear optimization program may be implemented as a nonlinear estimation filter using visual tag data, visual inertial odometry (VIO) navigation system data, and GPS navigation system data to solve for tag and vehicle poses & transforms. If the drone flies for an extended period of time without seeing any of the fiducials, the navigation frame is prone to drift. The joint optimization problem allows recovery the positions of all of the fiducials, most importantly the root fiducial that on the landing surface, given a single observation of one of the fiducials. The sizes of the fiducials (e.g., visual tags) can be designed to offer different detection distances. The "root" fiducial (e.g., the fiducial 120) is the smallest.

The process 900 includes controlling 950, based on the pose of the auxiliary fiducial, the propulsion mechanism to cause the unmanned aerial vehicle to fly to a location in a vicinity of the landing surface. For example, a processing apparatus (e.g., the processing apparatus 410) may use a propulsion controller interface (e.g., the propulsion control interface 442 to control 950 the propulsion system (e.g., one or more propellers driven by electric motors) to fly to a location in a vicinity of the landing surface. In some implementations, the dock includes a box (e.g., the box 140) configured to enclose the landing surface (e.g., the landing surface 110) in a first arrangement (e.g., as shown in FIG. 3B) and expose the landing surface in a second arrangement (e.g., as shown in FIG. 3A), and in which the auxiliary fiducial (e.g., the auxiliary fiducial 122) is located on an outer surface of the box.

The process 900 includes detecting 960 a root fiducial on a landing surface in at least one of the one or more images. For example, the root fiducial may be detected 960 as described in relation to step 630 of the process 600 of FIG. 6.

The process 900 includes determining 970 a pose of the root fiducial based on the one or more images. For example, the pose of the root fiducial may be determined 970 as described in relation to step 640 of the process 600 of FIG. 6.

The process 900 includes controlling 980, based on the pose of the root fiducial, the propulsion mechanism to cause the unmanned aerial vehicle to land on the landing surface. For example, the propulsion system may be controlled 980, based on the pose of the root fiducial, to cause the unmanned aerial vehicle to land on the landing surface as described in relation to step 650 of the process 600 of FIG. 6. For example, controlling 980, based on the pose of the root fiducial, the propulsion mechanism to cause the unmanned aerial vehicle to land on the landing surface may include implementing the process 700 of FIG. 7.

In a first aspect, the subject matter described in this specification can be embodied in systems that include an unmanned aerial vehicle including a propulsion mechanism, an image sensor, and processing apparatus; and a dock including a landing surface configured to hold the unmanned aerial vehicle and a fiducial on the landing surface, wherein the processing apparatus is configured to: control the propulsion mechanism to cause the unmanned aerial vehicle to fly to a first location in a vicinity of the dock; access one or more images captured using the image sensor; detect the fiducial in at least one of the one or more images; determine a pose of the fiducial based on the one or more images; and control, based on the pose of the fiducial, the propulsion mechanism to cause the unmanned aerial vehicle to land on the landing surface.

In the first aspect, the fiducial may be a root fiducial, and the systems may further comprise an auxiliary fiducial that is larger than the root fiducial, and the processing apparatus may be configured to: detect the auxiliary fiducial in at least one of the one or more images; determine a pose of the auxiliary fiducial based on the one or more images; and control, based on the pose of the auxiliary fiducial, the propulsion mechanism to cause the unmanned aerial vehicle to fly to a first location in a vicinity of the landing surface. The dock may include a box configured to enclose the landing surface in a first arrangement and expose the landing surface in a second arrangement. The auxiliary fiducial may be located on an outer surface of the box. In the first aspect, the processing apparatus may be configured to: control the propulsion mechanism to cause the unmanned aerial vehicle to fly to a second location above the landing surface; control the propulsion mechanism to cause the unmanned aerial vehicle to descend toward the fiducial on the landing surface; responsive to reaching a predetermined height above the landing surface, control the propulsion mechanism to cause the unmanned aerial vehicle to hover at the predetermined height above the landing surface until error estimates for a pose and velocity of the unmanned aerial vehicle meet stability conditions; and, responsive to the stability conditions being met, control the propulsion mechanism to cause the unmanned aerial vehicle to perform a final approach to touch down on the landing surface. In the first aspect, the processing apparatus may be configured to: while the final approach is being performed, monitor inertial measurements of the unmanned aerial vehicle to check whether the landing surface has been properly engaged; and, responsive to a determination that the landing surface has not been properly engaged, abort the final approach by controlling the propulsion mechanism to cause the unmanned aerial vehicle to rise. In the first aspect, the dock may include a retractable arm and the landing surface is positioned at an end of the retractable arm. For example, the dock may include a box configured to enclose the landing surface in a first arrangement of the dock and expose the landing surface in a second arrangement of the dock, wherein the dock is configured to transition from the first arrangement to the second arrangement automatically by performing steps including opening a door of the box and extending the retractable arm to move the landing surface from inside the box to outside of the box. In the first aspect, the propulsion mechanism may include propellers, and the processing apparatus may be configured to: automatically fold the propellers by turning the propellers while the retractable arm is being retracted to pull the unmanned aerial vehicle on the landing surface into the box. In the first aspect, the dock may include a soft roller attached to a top interior surface of the box that is positioned to engage with a body of the unmanned aerial vehicle as the unmanned aerial vehicle is pulled into a resting position inside the box by the retractable arm. In the first aspect, the landing surface may have a funnel geometry shaped to fit a bottom surface of the unmanned aerial vehicle at a base of the funnel. For example, the dock may include conducting contacts of a battery charger on the landing surface, positioned at the bottom of the funnel. In the first aspect, the unmanned aerial vehicle may include a battery and the dock includes a charger configured to charge the battery while the unmanned aerial vehicle is on the landing surface. In the first aspect, the dock may include one or more pneumatic blowers positioned to blow air on a lens of the unmanned aerial vehicle that covers the image sensor while the unmanned aerial vehicle is on the landing surface.

In a second aspect, the subject matter described in this specification can be embodied in methods that include controlling a propulsion mechanism of an unmanned aerial vehicle to cause the unmanned aerial vehicle to fly to a first location in a vicinity of a dock that includes a landing surface configured to hold the unmanned aerial vehicle and a fiducial on the landing surface; accessing one or more images captured using an image sensor of the unmanned aerial vehicle; detecting the fiducial in at least one of the one or more images; determining a pose of the fiducial based on the one or more images; and controlling, based on the pose of the fiducial, the propulsion mechanism to cause the unmanned aerial vehicle to land on the landing surface.

In the second aspect, the fiducial may be a root fiducial, and the methods may comprise: detecting an auxiliary fiducial in at least one of the one or more images, wherein the auxiliary fiducial is larger than the root fiducial; determining a pose of the auxiliary fiducial based on the one or more images; and controlling, based on the pose of the auxiliary fiducial, the propulsion mechanism to cause the unmanned aerial vehicle to fly to a first location in a vicinity of the landing surface. For example, the dock may include a box configured to enclose the landing surface in a first arrangement and expose the landing surface in a second arrangement, and the auxiliary fiducial may be located on an outer surface of the box. In the second aspect, the methods may include controlling the propulsion mechanism to cause the unmanned aerial vehicle to fly to a second location above the landing surface; controlling the propulsion mechanism to cause the unmanned aerial vehicle to descend toward the fiducial on the landing surface; responsive to reaching a predetermined height above the landing surface, controlling the propulsion mechanism to cause the unmanned aerial vehicle to hover at the predetermined height above the landing surface until error estimates for a pose and velocity of the unmanned aerial vehicle meet stability conditions; and, responsive to the stability conditions being met, controlling the propulsion mechanism to cause the unmanned aerial vehicle to perform a final approach to touch down on the landing surface. In the second aspect, the methods may include, while the final approach is being performed, monitoring inertial measurements of the unmanned aerial vehicle to check whether the landing surface has been properly engaged; and, responsive to a determination that the landing surface has not been properly engaged, aborting the final approach by controlling the propulsion mechanism to cause the unmanned aerial vehicle to rise. In the second aspect, the dock may include a retractable arm and the landing surface is positioned at an end of the retractable arm. For example, the dock may include a box configured to enclose the landing surface in a first arrangement of the dock and expose the landing surface in a second arrangement of the dock, and the methods may further comprise: transitioning the dock from the first arrangement to the second arrangement automatically by performing steps including opening a door of the box and extending the retractable arm to move the landing surface from inside the box to outside of the box. For example, the propulsion mechanism may include propellers, and the methods may comprise: automatically folding the propellers by turning the propellers while the retractable arm is being retracted to pull the unmanned aerial vehicle on the landing surface into the box. In the second aspect, the methods may include automatically charging a battery of the unmanned aerial vehicle using a charger included in the dock while the unmanned aerial vehicle is on the landing surface. In the second aspect, the methods may include automatically cleaning a lens of the unmanned aerial vehicle that covers the image sensor by using a pneumatic blower positioned in the dock to blow air on the lens while the unmanned aerial vehicle is on the landing surface.

In a third aspect, the subject matter described in this specification can be embodied in a non-transitory computer-readable storage medium that includes instructions that, when executed by a processor, facilitate performance of operations comprising: controlling a propulsion mechanism of an unmanned aerial vehicle to cause the unmanned aerial vehicle to fly to a first location in a vicinity of a dock that includes a landing surface configured to hold the unmanned aerial vehicle and a fiducial on the landing surface; accessing one or more images captured using an image sensor of the unmanned aerial vehicle; detecting the fiducial in at least one of the one or more images; determining a pose of the fiducial based on the one or more images; and controlling, based on the pose of the fiducial, the propulsion mechanism to cause the unmanned aerial vehicle to land on the landing surface.

In the third aspect, the fiducial may be a root fiducial, and the non-transitory computer-readable storage medium may include instructions that, when executed by a processor, facilitate performance of operations comprising: detecting an auxiliary fiducial in at least one of the one or more images, wherein the auxiliary fiducial is larger than the root fiducial; determining a pose of the auxiliary fiducial based on the one or more images; and controlling, based on the pose of the auxiliary fiducial, the propulsion mechanism to cause the unmanned aerial vehicle to fly to a first location in a vicinity of the landing surface. In the third aspect, the dock may include a box configured to enclose the landing surface in a first arrangement and expose the landing surface in a second arrangement, and the auxiliary fiducial may be located on an outer surface of the box. In the third aspect, the non-transitory computer-readable storage medium may include instructions that, when executed by a processor, facilitate performance of operations comprising: controlling the propulsion mechanism to cause the unmanned aerial vehicle to fly to a second location above the landing surface; controlling the propulsion mechanism to cause the unmanned aerial vehicle to descend toward the fiducial on the landing surface; responsive to reaching a predetermined height above the landing surface, controlling the propulsion mechanism to cause the unmanned aerial vehicle to hover at the predetermined height above the landing surface until error estimates for a pose and velocity of the unmanned aerial vehicle meet stability conditions; and, responsive to the stability conditions being met, controlling the propulsion mechanism to cause the unmanned aerial vehicle to perform a final approach to touch down on the landing surface. In the third aspect, the non-transitory computer-readable storage medium may include instructions that, when executed by a processor, facilitate performance of operations comprising: while the final approach is being performed, monitoring inertial measurements of the unmanned aerial vehicle to check whether the landing surface has been properly engaged; and, responsive to a determination that the landing surface has not been properly engaged, aborting the final approach by controlling the propulsion mechanism to cause the unmanned aerial vehicle to rise. In the third aspect, the dock may include a retractable arm and the landing surface is positioned at an end of the retractable arm.

In a fourth aspect, the subject matter described in this specification can be embodied in methods that include accessing one or more images captured using an image sensor of an unmanned aerial vehicle; detecting an auxiliary fiducial in at least one of the one or more images; determining a pose of the auxiliary fiducial based on the one or more images; controlling, based on the pose of the auxiliary fiducial, a propulsion mechanism of an unmanned aerial vehicle to cause the unmanned aerial vehicle to fly to a first position in a vicinity of a root fiducial; detecting a root fiducial in at least one of the one or more images that is captured from the first position, wherein the auxiliary fiducial is larger than the root fiducial; determining a pose of the root fiducial based on the one or more images; and controlling, based on the pose of the root fiducial, the propulsion mechanism to cause the unmanned aerial vehicle to land on the root fiducial.

In a fourth aspect, the root fiducial may be on a landing surface, and the methods may comprise: controlling the propulsion mechanism to cause the unmanned aerial vehicle to fly to a second location above the landing surface; controlling the propulsion mechanism to cause the unmanned aerial vehicle to perform a descent toward the root fiducial on the landing surface; responsive to reaching a predetermined height above the landing surface, controlling the propulsion mechanism to cause the unmanned aerial vehicle to hover at the predetermined height above the landing surface until error estimates for a pose and a velocity of the unmanned aerial vehicle meet stability conditions; and, responsive to the stability conditions being met, controlling the propulsion mechanism to cause the unmanned aerial vehicle to perform a final approach to touch down on the landing surface. In a fourth aspect, the methods may comprise: while the final approach is being performed, monitoring inertial measurements of the unmanned aerial vehicle to check whether the landing surface has been properly engaged; and, responsive to a determination that the landing surface has not been properly engaged, aborting the final approach by controlling the propulsion mechanism to cause the unmanned aerial vehicle to rise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A system comprising:
an unmanned aerial vehicle including a propulsion mechanism, an image sensor, and a processing apparatus; and
a dock including a landing surface, wherein the landing surface is movable along a generally horizontal axis of movement and the unmanned aerial vehicle approaches the dock in a generally vertical landing direction, the landing surface being configured to hold the unmanned aerial vehicle and including a fiducial, wherein the processing apparatus is configured to:
control the propulsion mechanism to cause the unmanned aerial vehicle to fly to a first location in a vicinity of the dock;
access one or more images captured using the image sensor;
detect the fiducial in at least one of the one or more images;
determine a pose of the fiducial based on the one or more images; and
control, based on the pose of the fiducial, the propulsion mechanism to cause the unmanned aerial vehicle to land on the landing surface.

2. The system of claim 1, wherein the fiducial is a root fiducial, and further comprising an auxiliary fiducial that is larger than the root fiducial, and wherein the processing apparatus is configured to:
detect the auxiliary fiducial in at least one of the one or more images;
determine a pose of the auxiliary fiducial based on the one or more images and
control, based on the pose of the auxiliary fiducial, the propulsion mechanism to cause the unmanned aerial vehicle to fly to a first location in a vicinity of the landing surface.

3. The system of claim 2, wherein the dock includes a box configured to enclose the landing surface in a first arrangement and expose the landing surface in a second arrangement, and wherein the auxiliary fiducial is located on an outer surface of the box.

4. The system of claim 3, wherein the landing surface is movable in generally parallel relation to the outer surface of the box on which the auxiliary fiducial is located.

5. The system of claim 1, wherein the processing apparatus is configured to:
control the propulsion mechanism to cause the unmanned aerial vehicle to fly to a second location above the landing surface;
control the propulsion mechanism to cause the unmanned aerial vehicle to descend toward the fiducial on the landing surface;
responsive to reaching a predetermined height above the landing surface, control the propulsion mechanism to cause the unmanned aerial vehicle to hover at the predetermined height above the landing surface until error estimates for a pose and velocity of the unmanned aerial vehicle meet stability conditions; and
responsive to the stability conditions being met, control the propulsion mechanism to cause the unmanned aerial vehicle to perform a final approach to touch down on the landing surface.

6. The system of claim 5, wherein the processing apparatus is configured to:

while the final approach is being performed, monitor inertial measurements of the unmanned aerial vehicle to check whether the landing surface has been properly engaged; and responsive to a determination that the landing surface has not been properly engaged, abort the final approach by controlling the propulsion mechanism to cause the unmanned aerial vehicle to rise.

7. The system of claim 1, wherein the dock includes a retractable arm and the landing surface is positioned at an end of the retractable arm.

8. The system of claim 7, wherein the dock includes a box configured to enclose the landing surface in a first arrangement of the dock and expose the landing surface in a second arrangement of the dock, wherein the dock is configured to transition from the first arrangement to the second arrangement automatically by performing steps including opening a door of the box and extending the retractable arm to move the landing surface from inside the box to outside of the box.

9. The system of claim 8, wherein the propulsion mechanism includes propellers, and the processing apparatus is configured to:

automatically folding the propellers by turning the propellers while the retractable arm is being retracted to pull the unmanned aerial vehicle on the landing surface into the box.

10. The system of claim 8, wherein the dock includes a soft roller attached to a top interior surface of the box that is positioned to engage with a body of the unmanned aerial vehicle as the unmanned aerial vehicle is pulled into a resting position inside the box by the retractable arm.

11. The system of claim 1, wherein the landing surface includes a plurality of tapered sides to fit a bottom surface of the unmanned aerial vehicle at a base of the landing surface.

12. The system of claim 11, wherein the dock includes conducting contacts of a battery charger on the landing surface, positioned at the base of the landing surface.

13. The system of claim 1, wherein the unmanned aerial vehicle includes a battery and the dock includes a charger configured to charge the battery while the unmanned aerial vehicle is on the landing surface.

14. A system comprising:
a dock including:
a first fiducial located on an outer surface thereof; and
a second fiducial located on a landing surface movable in generally parallel relation to the outer surface on which the first fiducial is located such that the second fiducial is movable into and out of the dock; and
an unmanned aerial vehicle configured for engagement with the landing surface, the unmanned aerial vehicle including a processing apparatus configured to:
detect the first fiducial and the second fiducial in at least one of one or more images captured by the unmanned aerial vehicle; and
control the unmanned aerial vehicle based on orientations of the first fiducial and the second fiducial to land the unmanned aerial vehicle on the landing surface.

15. The system of claim 14, wherein the first fiducial is larger than the second fiducial to facilitate visual localization of the first fiducial from farther distances as the unmanned aerial vehicle approaches the dock.

16. The system of claim 14, wherein the processing apparatus is configured to:
cause the unmanned aerial vehicle to fly to a first location based upon detection of the first fiducial; and
cause the unmanned aerial vehicle to fly to a second location in a vicinity of the landing surface based upon detection of the second fiducial.

17. The system of claim 16, wherein the processing apparatus is further configured to:
cause the unmanned aerial vehicle to hover at a predetermined height above the landing surface until error estimates for the unmanned aerial vehicle meet stability conditions; and
responsive to the stability conditions being met, cause the unmanned aerial vehicle to perform a final approach to engage the landing surface.

18. A system comprising:
an enclosure;
a first fiducial located on an outer surface of the enclosure and defining a first configuration;
a retractable arm supporting a landing surface configured to receive a vehicle approaching the enclosure in a generally vertical landing direction, the retractable arm being movable along a generally horizontal axis of movement between a retracted position, in which the landing surface is located within the enclosure, and an extended position, in which the landing surface is located externally of the enclosure; and
a second fiducial located on the landing surface and defining a second configuration different than the first configuration.

19. The system of claim 18, wherein the first fiducial defines a first surface area and the second fiducial defines a second surface area, the first surface area being substantially larger than the second surface area.

20. The system of claim 18, further comprising an unmanned aerial vehicle configured for docking with the enclosure, the unmanned aerial vehicle including a processing apparatus configured to:
detect the first fiducial and the second fiducial in at least one of one or more images captured by the unmanned aerial vehicle; and
control the unmanned aerial vehicle based on orientations of the first fiducial and the second fiducial to land the unmanned aerial vehicle on the landing surface.

* * * * *